United States Patent
Sato

(10) Patent No.: US 8,243,728 B2
(45) Date of Patent: Aug. 14, 2012

(54) APPARATUS AND METHOD FOR TRANSMITTING PACKETS IN A PACKET SWITCHED NETWORK

(75) Inventor: Masahiro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 621 days.

(21) Appl. No.: 12/401,732

(22) Filed: Mar. 11, 2009

(65) Prior Publication Data

US 2009/0245263 A1    Oct. 1, 2009

(30) Foreign Application Priority Data

Mar. 27, 2008  (JP) ................................. 2008-084646

(51) Int. Cl.
*H04L 12/28* (2006.01)
(52) U.S. Cl. ....................................... 370/389; 370/401
(58) Field of Classification Search .................. None
See application file for complete search history.

(56) References Cited

U.S. PATENT DOCUMENTS

| | | | |
|---|---|---|---|
| 7,515,605 B2 * | 4/2009 | Harel et al. .................... 370/466 |
| 7,710,993 B1 * | 5/2010 | Burton et al. .................. 370/419 |
| 7,965,656 B1 * | 6/2011 | Wijnands et al. ............. 370/256 |
| 2004/0037279 A1 * | 2/2004 | Zelig et al. ..................... 370/390 |
| 2006/0187942 A1 | 8/2006 | Mizutani et al. |
| 2007/0025241 A1 * | 2/2007 | Nadeau et al. ................ 370/229 |
| 2007/0030851 A1 * | 2/2007 | Sinicrope et al. ............. 370/392 |
| 2007/0053366 A1 * | 3/2007 | Booth et al. ................... 370/400 |
| 2007/0115985 A1 | 5/2007 | Choudhury et al. |
| 2007/0127479 A1 * | 6/2007 | Sinicrope et al. ............. 370/392 |
| 2008/0031129 A1 * | 2/2008 | Arseneault et al. ........... 370/218 |
| 2008/0031263 A1 * | 2/2008 | Ervin et al. .................... 370/397 |
| 2008/0062996 A1 * | 3/2008 | Kaippallimalil et al. .. 370/395.1 |
| 2008/0101390 A1 * | 5/2008 | Hu ................................. 370/401 |
| 2008/0198858 A1 * | 8/2008 | Townsley et al. ............. 370/401 |
| 2008/0279110 A1 * | 11/2008 | Hart et al. ...................... 370/248 |

(Continued)

FOREIGN PATENT DOCUMENTS

JP    2006-237678    9/2006

(Continued)

OTHER PUBLICATIONS

Notice of Reasons for Refusal dated Apr. 3, 2012, from corresponding Japanese Application No. 2008-08464 with partial English translation.

*Primary Examiner* — Bob Phunkulh
(74) *Attorney, Agent, or Firm* — Katten Muchin Rosenman LLP

(57) ABSTRACT

An apparatus includes means for transmitting a packet, through one of a plurality of pseudo wires, from a PW ingress node thereof to a PW egress node thereof. Each of the plurality of pseudo wires is a communication path for transmitting a packet between a pair of end nodes included in three or more nodes communicably connected via a tunnel in a packet switched network. The PW ingress node is one of the pair of end nodes from which the packet comes into the one of the plurality of pseudo wires, and the PW egress node is the other one of the pair of end nodes from which the packet goes out thereof. The apparatus further includes means for extracting a packet transmitted through the one of the plurality of pseudo wires from among packets being transmitted through the tunnel.

12 Claims, 24 Drawing Sheets

U.S. PATENT DOCUMENTS

| | | | |
|---|---|---|---|
| 2008/0281980 A1* | 11/2008 | Del Regno et al. | 709/238 |
| 2008/0291921 A1* | 11/2008 | Du et al. | 370/395.53 |
| 2009/0086621 A1* | 4/2009 | Wan et al. | 370/218 |
| 2009/0154453 A1* | 6/2009 | Shah et al. | 370/389 |
| 2009/0168783 A1* | 7/2009 | Mohan et al. | 370/395.5 |
| 2009/0238084 A1* | 9/2009 | Nadeau et al. | 370/248 |
| 2010/0098094 A1* | 4/2010 | Jounay et al. | 370/401 |

FOREIGN PATENT DOCUMENTS

| | | |
|---|---|---|
| JP | 2007129703 | 5/2007 |

* cited by examiner

FIG. 17

FDB, 32

| DA | NUMBER OF HOPS | PW ID/IP ADDRESS | TUNNEL ID |
|----|----------------|------------------|-----------|
|    | 1              | PW1/PE#2         | 2 (Label=3) |
|    | 1              | PW2/PE#3         | 2 (Label=3) |
|    | ...            | ...              | ...       |
| ⋮  | ⋮              | ⋮                | ⋮         |

64, 66, 68, 70

APPARATUS AND METHOD FOR TRANSMITTING PACKETS IN A PACKET SWITCHED NETWORK

CROSS-REFERENCE TO RELATED APPLICATIONS

This application is based upon and claims the benefit of priority of the prior Japanese Patent Application No. 2008-084646, filed on Mar. 27, 2008, the entire contents of which are incorporated herein by reference.

FIELD

The present invention relates to transmission of packets in a packet switched network.

BACKGROUND

A pseudo wire (PW) is a technology for providing, over a single packet switched network, line services such as the Ethernet (registered trademark) and asynchronous transfer mode (ATM), and is used for layer-2 virtual private network (L2VPN). Virtual private LAN service (VPLS) is a type of the L2VPN which realizes full mesh connections among a plurality of sites by use of the pseudo wire, as depicted in FIG. 22. A MPLS network is used for the VPLS, as a packet switched network. Referring to FIG. 22, reference alpha-numeral PE denotes a provider edge, reference alpha-numeral CE denotes a customer edge, and reference alpha-numeral FR denotes a frame relay.

With respect to the network technology mentioned above, Japanese Laid-open Patent Publication No. 2006-237678 discloses that an available bandwidth is allocated, by an egress node of a tunnel on which traffics are concentrated, to each of sessions to be multiplexed into the tunnel, and is then notified to an ingress node of the tunnel, which notifies the originating site of a packet to be transmitted, such as a home rooter or terminal device, about the available bandwidth.

SUMMARY

According to an aspect of the invention, an apparatus for transmitting a packet in a packet switched network includes pseudo wire setting means for setting, to a tunnel communicably connecting three or more nodes in the packet switched network, a plurality of pseudo wires each defined as a communication path for transmitting a packet between a pair of end nodes included in the three or more nodes communicably connected via the tunnel.

According to another aspect of the invention, an apparatus includes packet transmitting means for transmitting a packet, through one of the plurality of pseudo wires, from a PW ingress node thereof to a PW egress node thereof, wherein the PW ingress node is one of the pair of end nodes from which the packet comes into the one of the plurality of pseudo wires and the PW egress node is the other one of the pair of end nodes from which the packet goes out of the one of the plurality of pseudo wires, and the apparatus includes packet receiving means for extracting a packet transmitted through the one of the plurality of pseudo wires from among packets being transmitted through the tunnel.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF THE DRAWINGS

FIG. 17 is a diagram illustrating an example of a configuration of path information, according to an embodiment;

DESCRIPTION OF EMBODIMENTS

Figure 23:
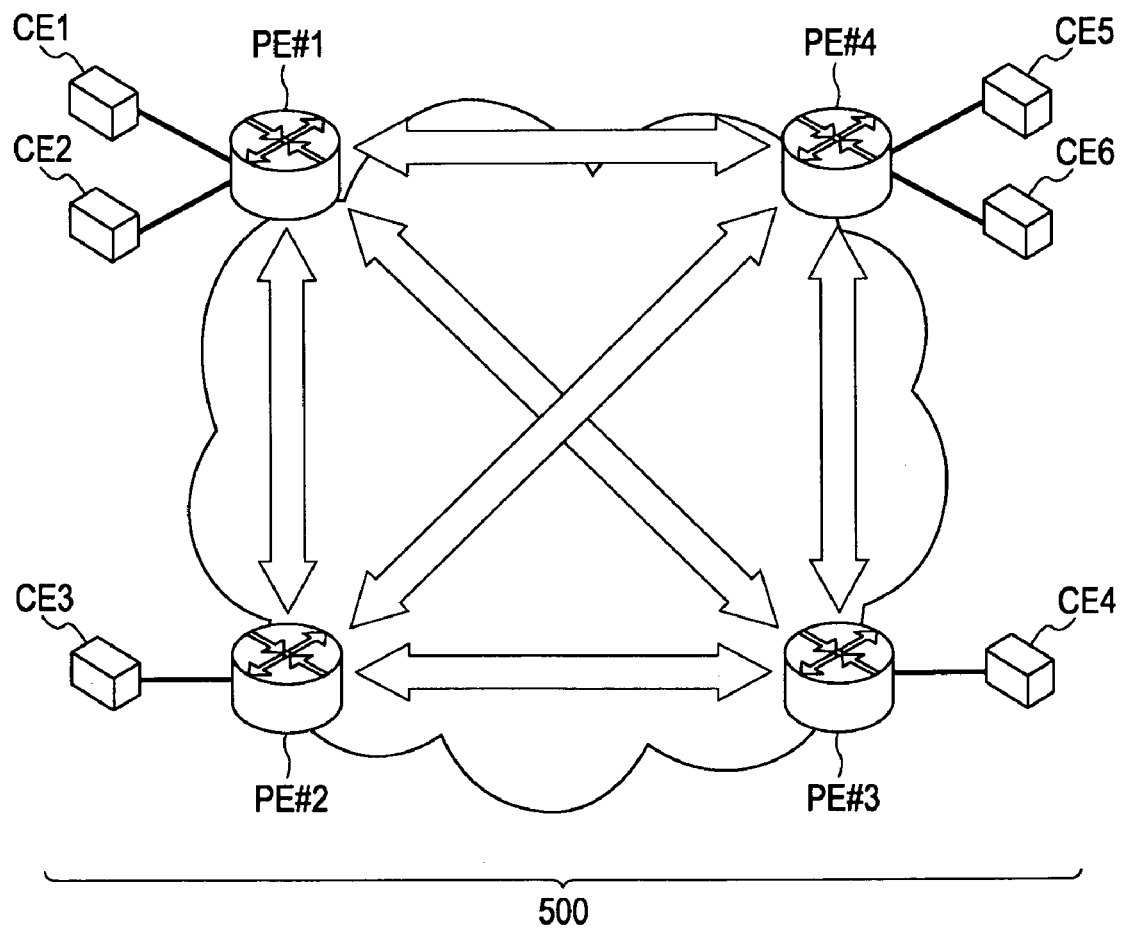
FIG. 23 is an explanatory diagram illustrating an example of a VPLS network.
Figure 24:
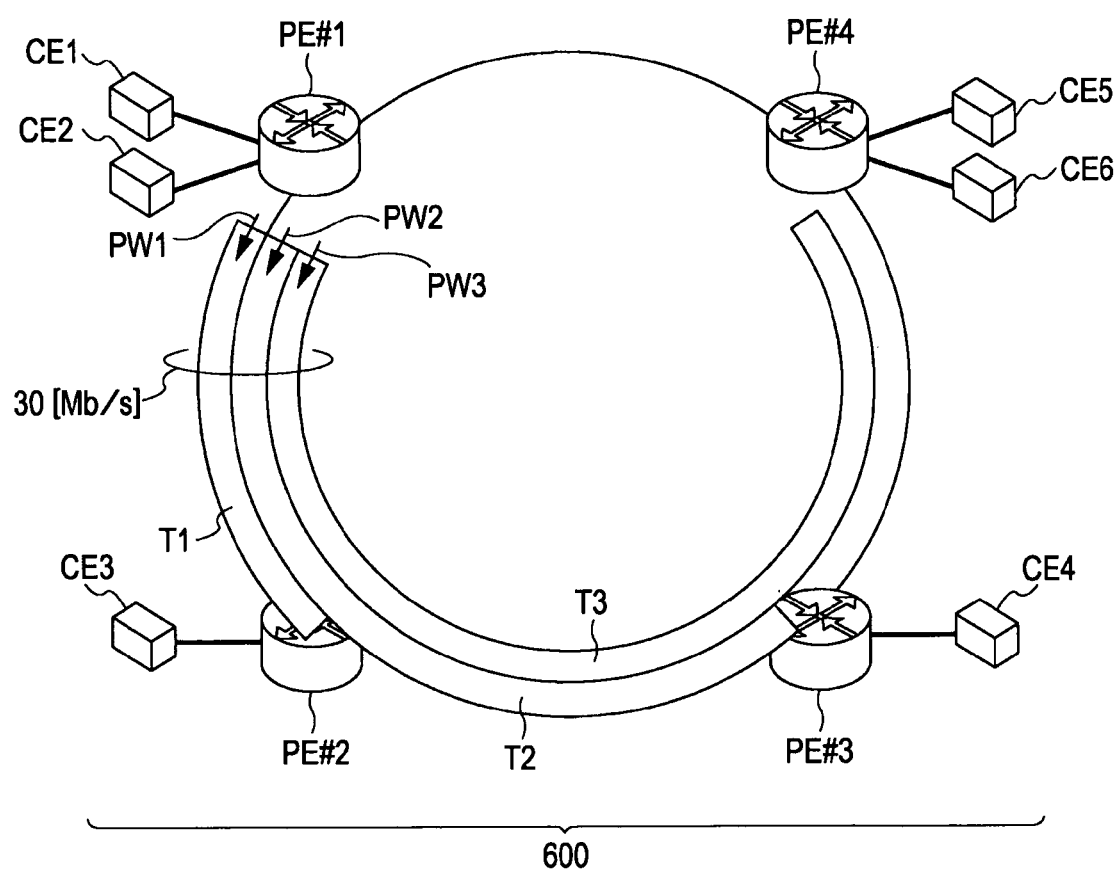
FIG. 24 is an explanatory diagram illustrating an example of configuration of a VPLS network.

FIG. 23 is an explanatory diagram illustrating an example of a VPLS network, where a VPLS network 500 includes provider edges PE#1, PE#2, PE#3, and PE#4, and provides a communication bandwidth of 10 [Mb/s] for each pair of provider edges thereamong. Further, FIG. 24 is an explanatory diagram illustrating an example of configuration of a VPLS network, where a VPLS network 600 includes provider edges PE#1, PE#2, PE#3, and PE#4 that are connected in a ring topology.

In the configuration of the VPLS network 600, tunnels T1, T2, and T3 are set, respectively, to pseudo wires PW1, PW2, and PW3 each connecting a pair of sites. Therefore, the setting of three pdeudo wires each starting from the PE#1 is required, and a total of three tunnels T1, T2, and T3 each having a communication bandwidth of 10 [Mb/s] need to be set. Although the configuration in FIG. 24 indicates the case in which the ingress node of the three tunnels T1, T2, and T3 is the PE#1 for convenience of explanation, actually three tunnels need to be set for each of the provider edge nodes PE#1, PE#2, PE#3, and PE#4.

A VPLS network needs to ensure a communication bandwidth equal to or greater than a communication bandwidth to be provided for users of the network. With the configuration depicted in FIG. 24, in order to provide a communication bandwidth of 10 [Mb/s] for each of the tunnels T1, T2, and T3, a communication bandwidth of at least 30 [Mb/s] needs to be ensured, i.e., excessive bandwidth is needs to be ensured because each of a plurality of pseudo wires is accommodated into only one tunnel and the plurality of pseudo wires cannot share a bandwidth of a tunnel.

Japanese Laid-open Patent Publication No. 2006-237678 does not disclose or suggest the problem mentioned above and any configurations for solving the problem.

[First Embodiment]

Figure 1:
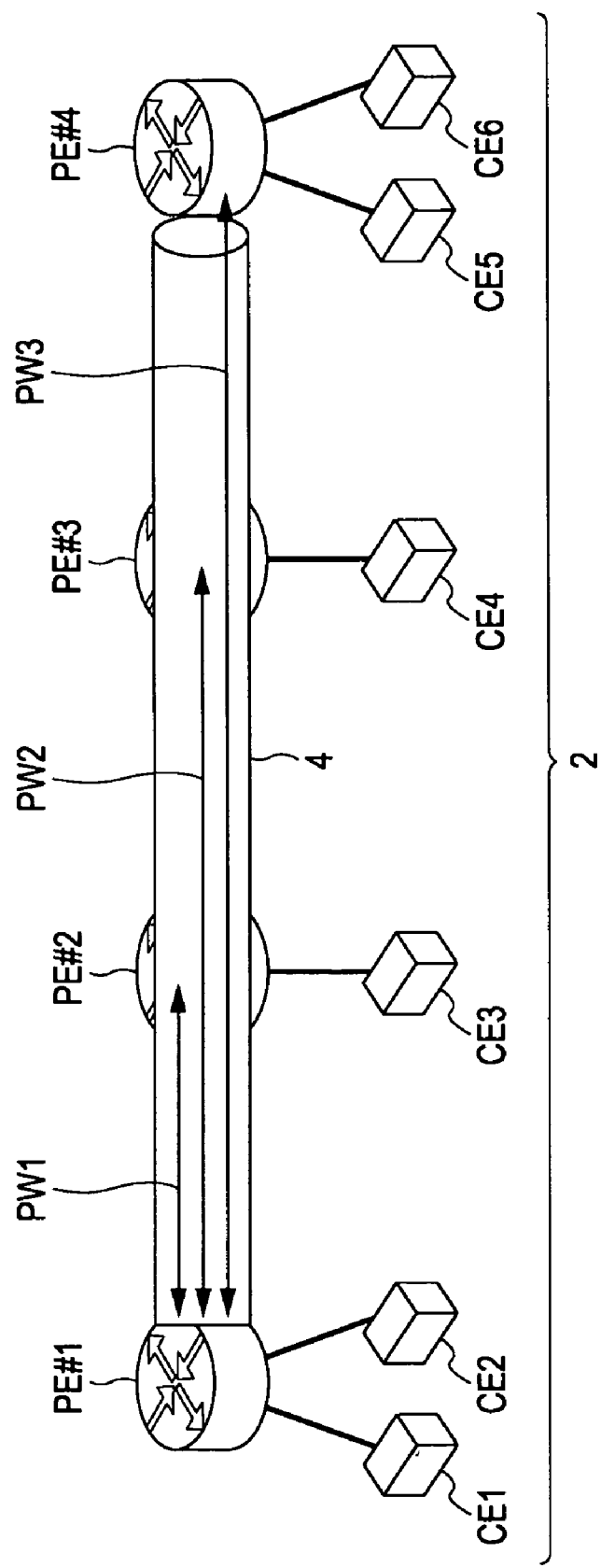
FIG. 1 is a diagram illustrating an example of a network configuration, according to an embodiment.

A first embodiment will be described by referring to FIG. 1. FIG. 1 is a diagram illustrating an example of a network configuration, according to the first embodiment. The configuration depicted in FIG. 1 is an example and the present invention is not limited to this.

In FIG. 1, a network 2 includes three or more nodes, in the case, provider edges PE#1, PE#2, PE#3, and PE#4, and a single MPLS tunnel 4 (hereinafter, simply referred to as "a tunnel") is set to each of the PE#1, PE#2, PE#3, and PE#4 in order to transfer packets by using a plurality of pseudo wires accommodated therein (in this case, PW1, PW2, and PW3).

The tunnel 4 is a tunnel that connects three or more nodes therein (in the case, provider edges PE#1, PE#2, PE#3, and PE#4), and a pseudo wire is configured so as to constitute a communication path of a packet between a pair of nodes positioned along the tunnel 4. Each of the PE#1, PE#2, PE#3, and PE#4 can be configured to include pseudo wire setting means for setting, to a tunnel communicably connecting three or more nodes in the packet switched network, a plurality of pseudo wires each defined as a communication path for transmitting a packet between a pair of end nodes included in the three or more nodes communicably connected via the tunnel.

Further, each of the PE#1, PE#2, PE#3, and PE#4 can be configured to include packet transmitting means for transmitting a packet, through one of the plurality of pseudo wires, from a PW ingress node thereof to a PW egress node thereof, and include packet receiving means for extracting a packet transmitted through the one of the plurality of pseudo wires from among packets being transmitted through the tunnel, wherein the PW ingress node is one of the pair of end nodes from which the packet comes into the one of the plurality of pseudo wires and the PW egress node is the other one of the pair of end nodes from which the packet goes out of the one of the plurality of pseudo wires.

In the case, the PE#1, PE#2, PE#3, and PE#4 are communicably connected via at least one tunnel 4 connecting tree or more nodes therein. A plurality of pseudo wires PW1, PW2, and PW3 each forming a communication path for transferring packets are set within the tunnel 4. In the case, the PW1 is set between a pair of end nodes: the PE#1 and the PE#2, the PW2 is set between a pair of end nodes: the PE#1 and the PE#3, and the PW3 is set between a pair of end nodes: PE#1 and PE#4. That is, the PW1, PW2, and PW3 are set as a plurality of pseudo wires within the single tunnel 4, and the plurality of pseudo wires are multiplexed into the tunnel 4.

As to the PW1, the PE#1 is an ingress node of the pseudo wire PW1 and the PE#2 is an egress node of the pseudo wire PW1. Hereinafter, an ingress node of a pseudo wire is expressed as "a PW ingress node", and an egress node of a pseudo wire is expressed as "a PW egress node". Herein, a PW ingress node is one of a pair of end nodes from which a packet comes into a pseudo wire and a PW egress node is the other one of the pair of end nodes from which the packet goes out of the pseudo wire. Therefore, as to the PW2, the PE#1 is the PW ingress node and the PE#3 is the PW egress node. As to the PW3, the PE#1 is the PW ingress node, and the PE#4 is the PW egress node. As mentioned above, when a plurality of pseudo wires (PW1, PW2, and PW3) are set to a single tunnel 4, the PW egress node of each of the plurality of pseudo wires needs to identify a packet transmitted through the each of the plurality of pseudo wires from among packets transmitted through the tunnel 4.

Then, in order to identify a packet transmitted through the each of the plurality of pseudo wires from among packets transmitted through the tunnel 4, the number of hops N indicating the number of nodes passed by the packet is set to the packet. In the case, the number of hops N is the number of provider edges (PEs) passed by the packet, indicating the number of PEs positioned along the each of the plurality of pseudo wires from the PW ingress node to the PW egress node. The number of hops N is set by each of the PE#1, PE#2, PE#3, and PE#4, and can be set to a portion of an MPLS header of the packet so as to be checked by PE, e.g., set to "ttl" (time to live) field of the MPLS header. In the case, some of the PE#1, PE#2, PE#3, and PE#4 or all of them can be configured to be capable of setting the number of hops N to a packet to be transmitted.

Information for identifying the packet transmitted through the one of the plurality of pseudo wires, for example, the number of hops N described above, will be hereinafter also expressed as "a packet arrival identifier" because it notifies the PW egress node of the pseudo wire about an arrival of a packet transmitted through a pseudo wire.

Figure 2:
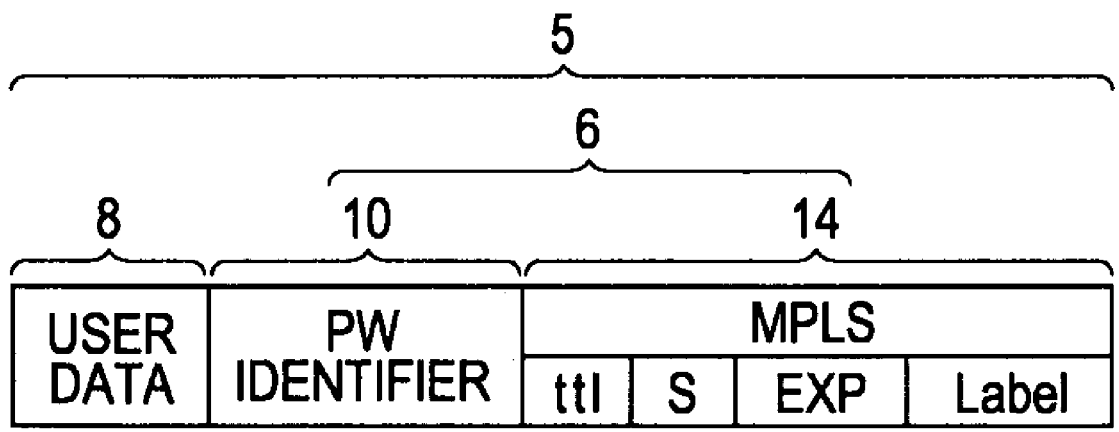
FIG. 2 is a diagram illustrating an example of a data format of a packet including a pseudo wire identifier, according to an embodiment.

Next, a description will be given of a data format of a packet with reference to FIG. 2. FIG. 2 is a diagram illustrating an example of a data format of a packet including a pseudo wire identifier. The data format depicted in FIG. 2 is an example, and the present invention is not limited to the format.

Referring to FIG. 2, a data format 5 includes a header 6 and user data 8. A PW identifier 10 and an MPLS header 14 are set to the header 6. The user data 8 is data of a user that is carried by a packet. The PW identifier 10 is an identification label for identifying each pseudo wire, and hereinafter will be also expressed as "a PW label".

The MPLS header 14 is information representing an attribute, structure, and control that are characteristic of an MPLS, and includes "ttl", "S" bit, "EXP", and "Label" fields. Reference alpha-numeral "ttl" denotes bits indicating a survival time of an MPLS packet meaning a maximum number of hops through which the MPLS packet can pass, and specifically the number of hops through which the MPLS packet passes along a pseudo wire from the PW ingress node thereof to the PW egress node is set thereto. With respect to the "ttl" field of the MPLS header 14, for example, the ingress node of the tunnel 4 can be configured to calculate the number of hops by using a Record Route Object (RRO) that is set to an RSVP-TE (Resource Reservation Protocol-Traffic Engineering) signaling message for setting the tunnel 4, and configured to set the calculated number of hops to the "ttl" field of the MPLS header 14.

The S-bit is bit information indicating "stacking", and is used for stacking a plurality of MPLS labels. In order to provide QoS (Quality of Service) information for a packet, information such as bandwidth and loss can be set to the "EXP" field of the MPLS header 14. The "label" field of the MPLS header 14 indicates a label number for determining the routing of label switching, and includes an MPLS label.

Figure 3:
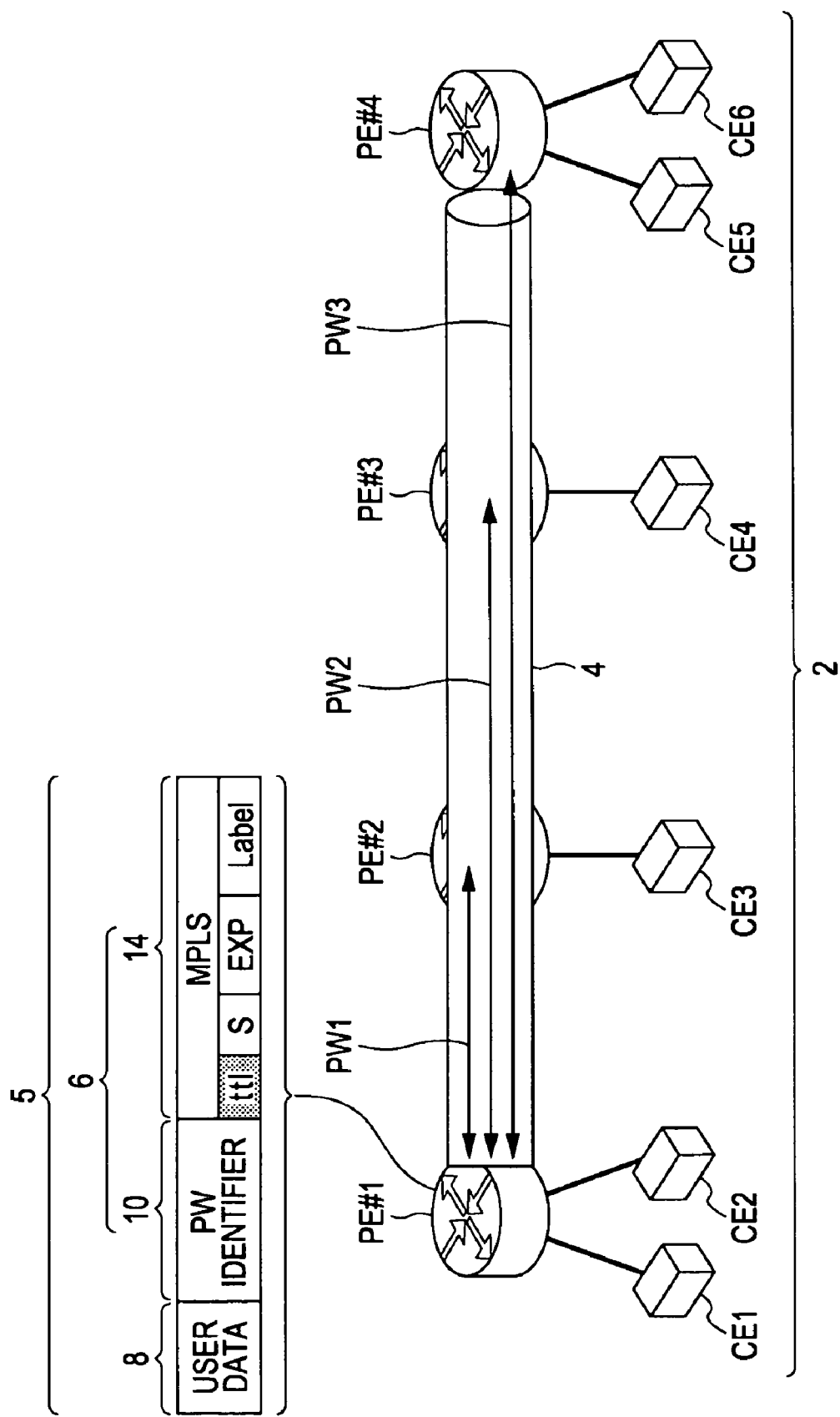
FIG. 3 is a diagram illustrating an example of processing for transmitting an MPLS header, according to an embodiment.
Figure 4:
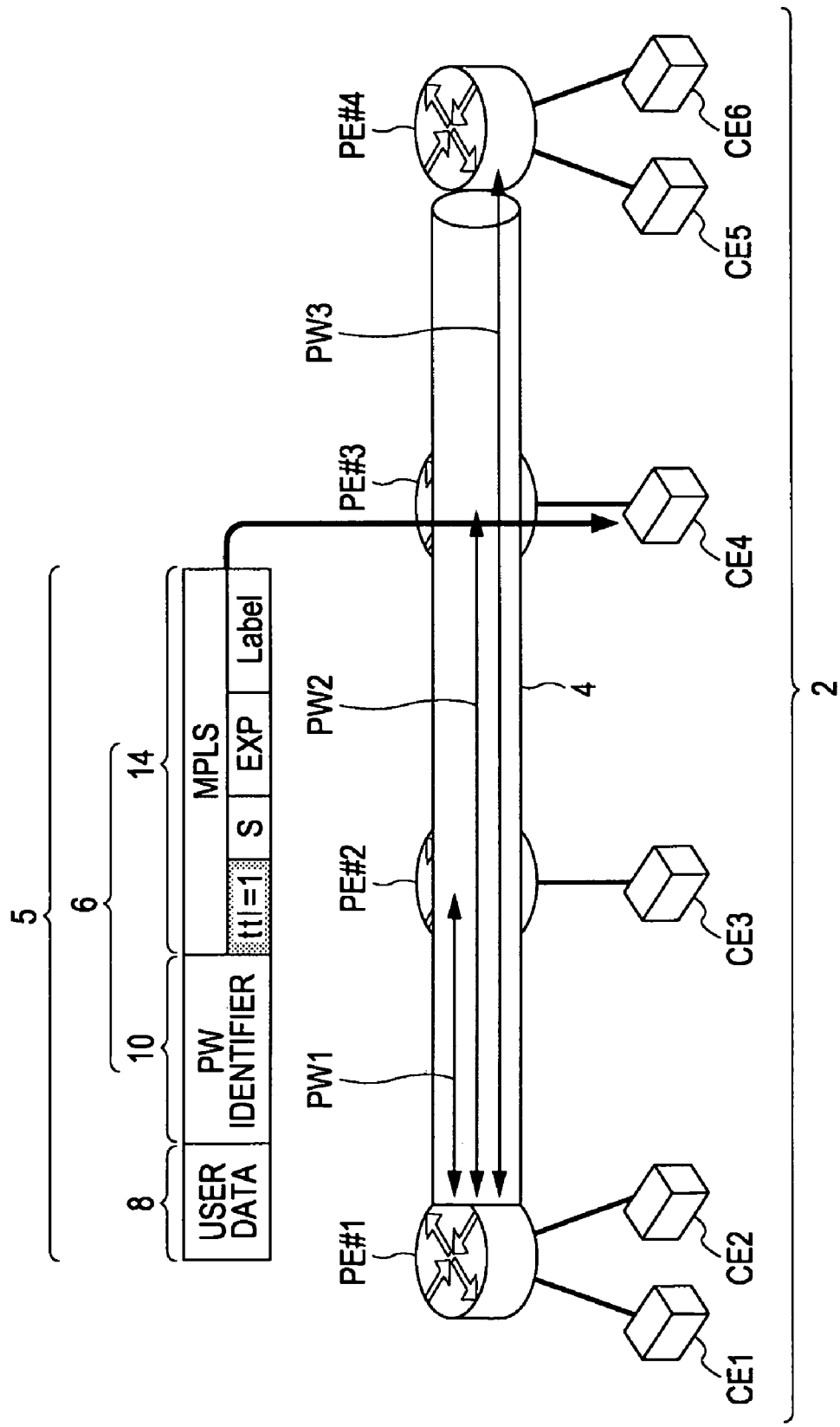
FIG. 4 is a diagram illustrating an example of processing for receiving an MPLS header, according to an embodiment.

Next, a description will be given of transmission and reception of an MPLS header with reference to FIGS. 3 and 4. FIG. 3 is a diagram illustrating an example of processing for transmitting an MPLS header. FIG. 4 is a diagram illustrating an example of processing for receiving an MPLS header. Configurations depicted in FIGS. 3 and 4 are examples and the present invention is not limited to the configurations. Referring to FIGS. 3 and 4, the same portions as those depicted in FIG. 1 are designated by the same reference alpha-numerals.

By the PE#1, PE#2, PE#3, and PE#4, a plurality of pseudo wires such as PW1, PW2, and PW3, can be multiplexed into one tunnel 4. Therefore, in order that a PW egress node can identify a packet transmitted through the pseudo wire, the PW ingress node PE#1 set the number of hops corresponding to each PW egress node, to the "ttl" field of the MPLS header 14 of the packet, and transmits the packet to each of the PW egress nodes of the PW1, PW2, PW3, that is, the PE#2, PE#3, and PE#4.

Referring to FIG. 4, the node that received a packet having the MPLS header 14 in which value 1 is set to the "ttl" field becomes a PW egress node which picks up the packet from the tunnel 4. In the case, the PE#3 that received the MPLS header 14 with "ttl"=1 becomes a PW egress node, and picks up the received packet from the tunnel 4. Then, the user data included in the received packet is transmitted to a CE (customer edge) in the downstream direction when the received packet includes a pseudo wire data.

In the case, since the PW ingress node is the PE#1 and the PW egress node is the PE#3, nodes hopped by the packet are the PE#2 and the PE#3. Therefore, the number of hops is 2 and [(the number of hops)=2] is set to "ttl" field of the MPLS header 14 at the PW ingress node. Then, the MPLS header 14 is transmitted from the PE#1 to the PE#3 through the PW2 in the tunnel 4 together with the user data.

Figure 5:
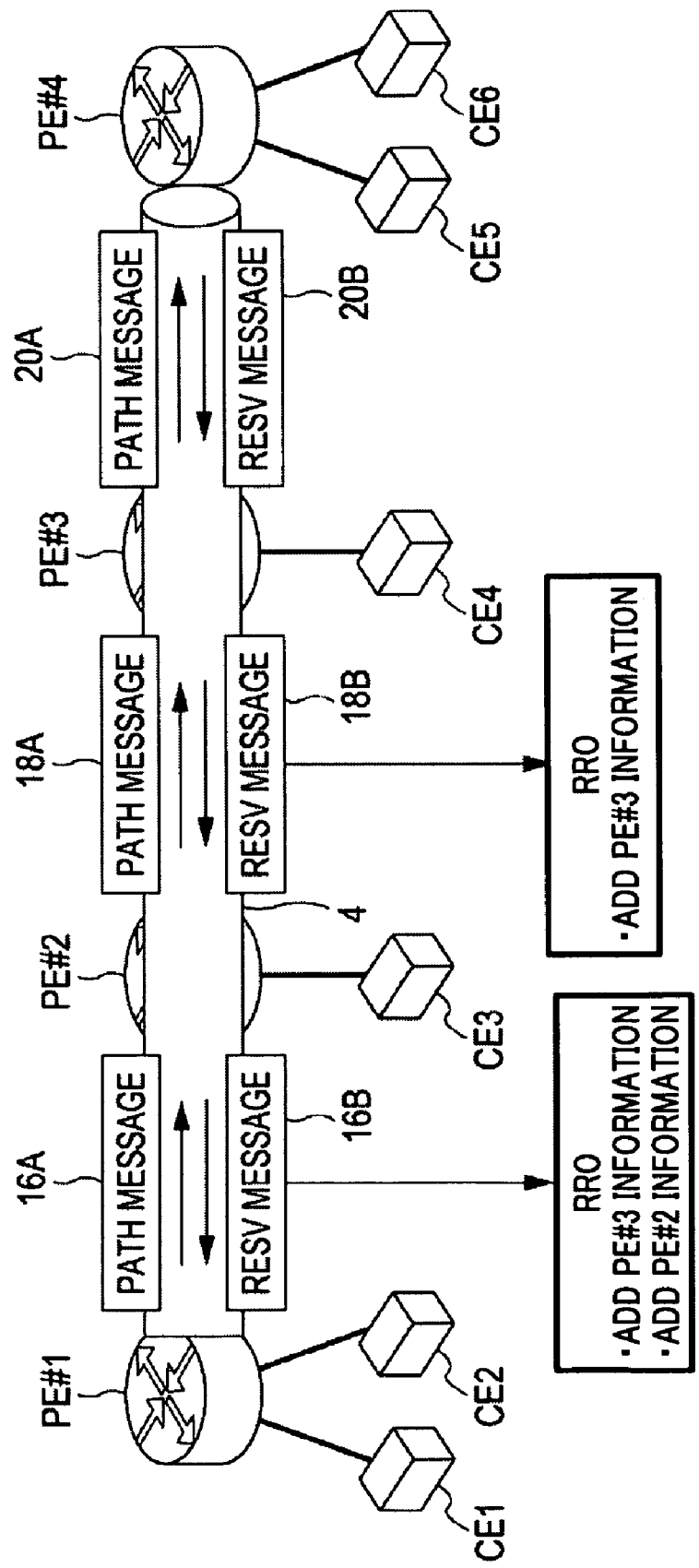
FIG. 5 is an explanatory diagram illustrating an example of a configuration of a record route object (RRO)

Next, a description will be given of a Record Route Object (RRO) with reference to FIG. 5. FIG. 5 is an explanatory diagram illustrating an example of a configuration of the RRO. The configuration depicted in FIG. 5 is an example and the present invention is not limited to the configuration. Referring to FIG. 5, the same portion as that depicted in FIG. 1 is designated by the same reference alpha-numeral.

The number of hops given to the "ttl" field of the MPLS header 14 (as depicted in FIG. 2) can be calculated by the ingress node of the tunnel 4 by using the RRO in the above-mentioned RSVP-TE signaling message for setting the tunnel 4. With the RSVP-TE, the ingress node of the tunnel 4 transmits a PATH message to the egress node of the tunnel 4. The RSVP-TE is means for determining the MPLS tunnel and ensuring the bandwidth. The egress node that received the PATH message returns in response thereto a RESV message to which the RRO information is added by the nodes positioned along the tunnel 4.

Referring to FIG. 5, a PATH message is transmitted from the ingress node PE#1 of the tunnel 4 to the egress node PE#4 thereof through intermediate nodes PE#2 and PE#3, and then a RESV message is send back from the egress node PE#4 to the ingress node through intermediate nodes PE#3 and PE#2. In the case of transmitting a packet as depicted FIG. 1, the RESV message 16B includes, as RRO information, both PE#3 information identifying the PE#3 and PE#2 information identifying the PE#2, and the RESV message 18B includes, as PRO information, PE#3 information indicating the PE#3. As a consequence, the ingress node PE#1 of the tunnel 4 can recognizes a route to be passed by each of a plurality of pseudo wires in the tunnel 4.

Figure 6:
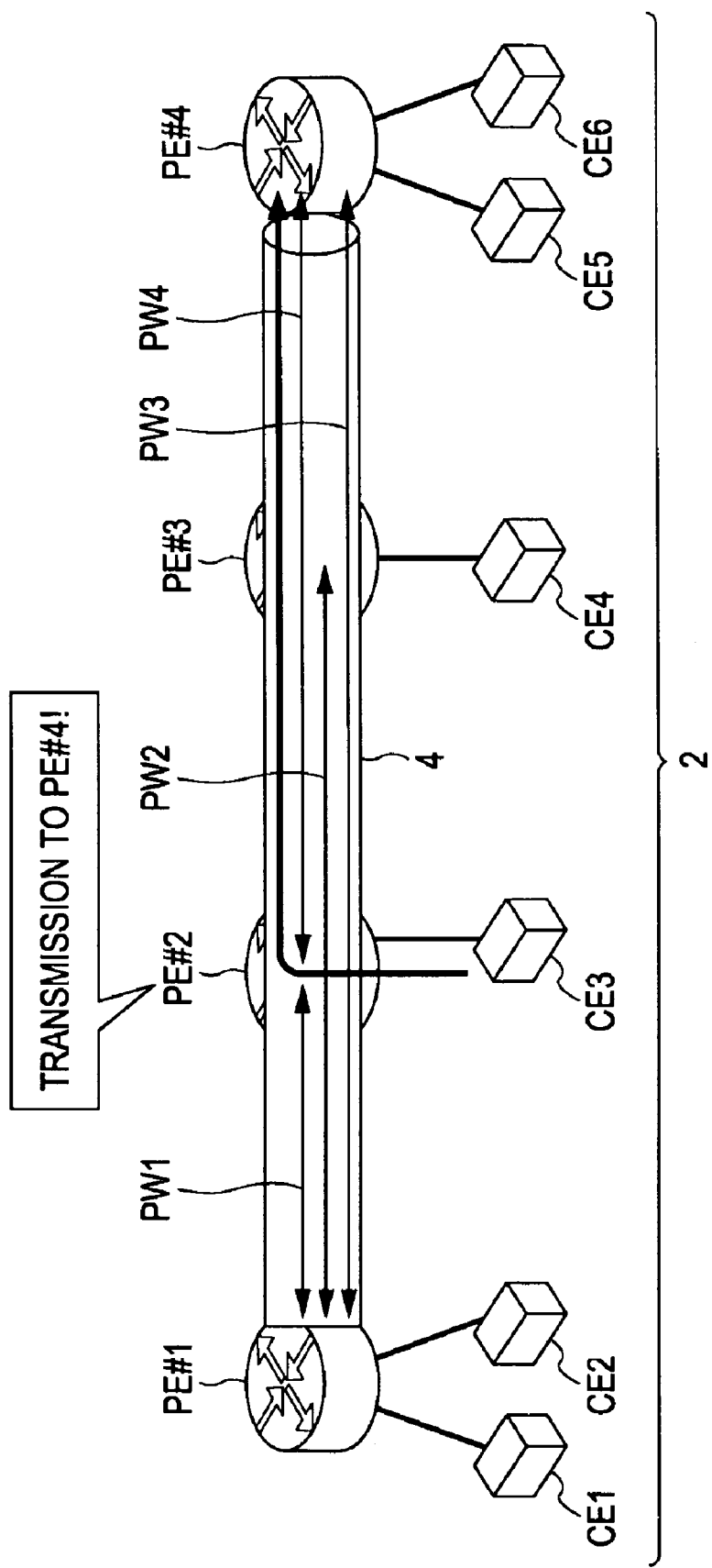
FIG. 6 is a diagram illustrating an example of processing of an intermediate node of a tunnel, according to an embodiment.

Next, a description will be given of processing in an intermediate node of the tunnel with reference to FIG. 6. FIG. 6 is a diagram illustrating an example of processing of an intermediate node of a tunnel. The configuration depicted in FIG. 6 is an example and the present invention is not limited to the configuration. Referring to FIG. 6, the same reference alpha-numerals as those depicted in FIG. 1 denote the same components.

According to the embodiment, the single tunnel 4 is set from the PE#1 to the PE#4, and between the PE#1 and the PE#4 along the tunnel 4, there exist two intermediate nodes: the PE#2 and PE#3. PW1, PW2, PW3, and PW4 can be set within the tunnel 4 as a plurality of pseudo wires each having a different pair of end nodes. Each of the PW1 to PW4 has a part of or the whole of the transmission bandwidth of the tunnel 4. In the case, it is assumed that a packet is transmitted from the intermediate node PE#2 to the PE#4 in the tunnel 4. As depicted in FIG. 6, the PW4 has, as a PW ingress node, the PE#2 positioned midway in the tunnel 4. Data transmitted from CE3 connected to the PE#2 to one of CEs connected to the PE#4 is encapsulated by the PE#2 to generate a packet, as will be described later. Thereafter, the generated packet is transmitted to the PE#4 through the PW4. The PE#4 decapsulates the packet transmitted through the PW4 to generate the original data, as will be described later, and transmits the decapsulated original data to the corresponding CE according to the address described in the original data.

As will be obvious according to the embodiment, data originating from the PE#2 reaches the PE#4 through the PW4. Similarly, data originating from the PE#1 can reach the PE#2 through the PW1. That is, within the tunnel 4 communicably connecting four nodes from the PE#1 to the PE#4, a plurality of pseudo wires (PW1 to PW4) each having a different part of the tunnel 4 as a communication path can be set. In other words, a plurality of pseudo wires (PW1 to PW4) are multiplexed into one tunnel (the tunnel 4), thereby suppressing the required total transmission bandwidth of the tunnel.

Figure 7:
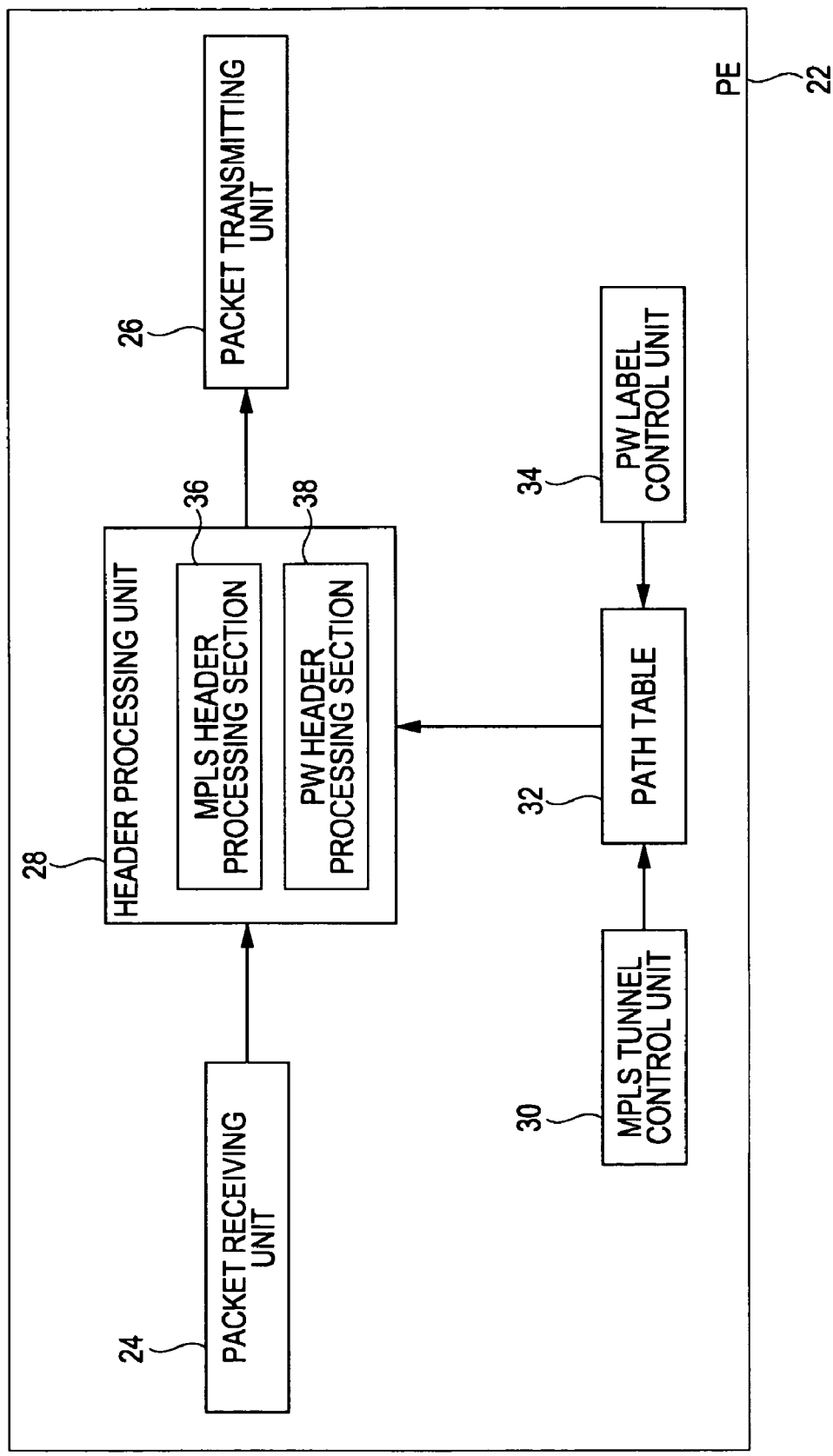
FIG. 7 is a diagram illustrating an example of a configuration of a provider edge, according to an embodiment.
Figure 8:
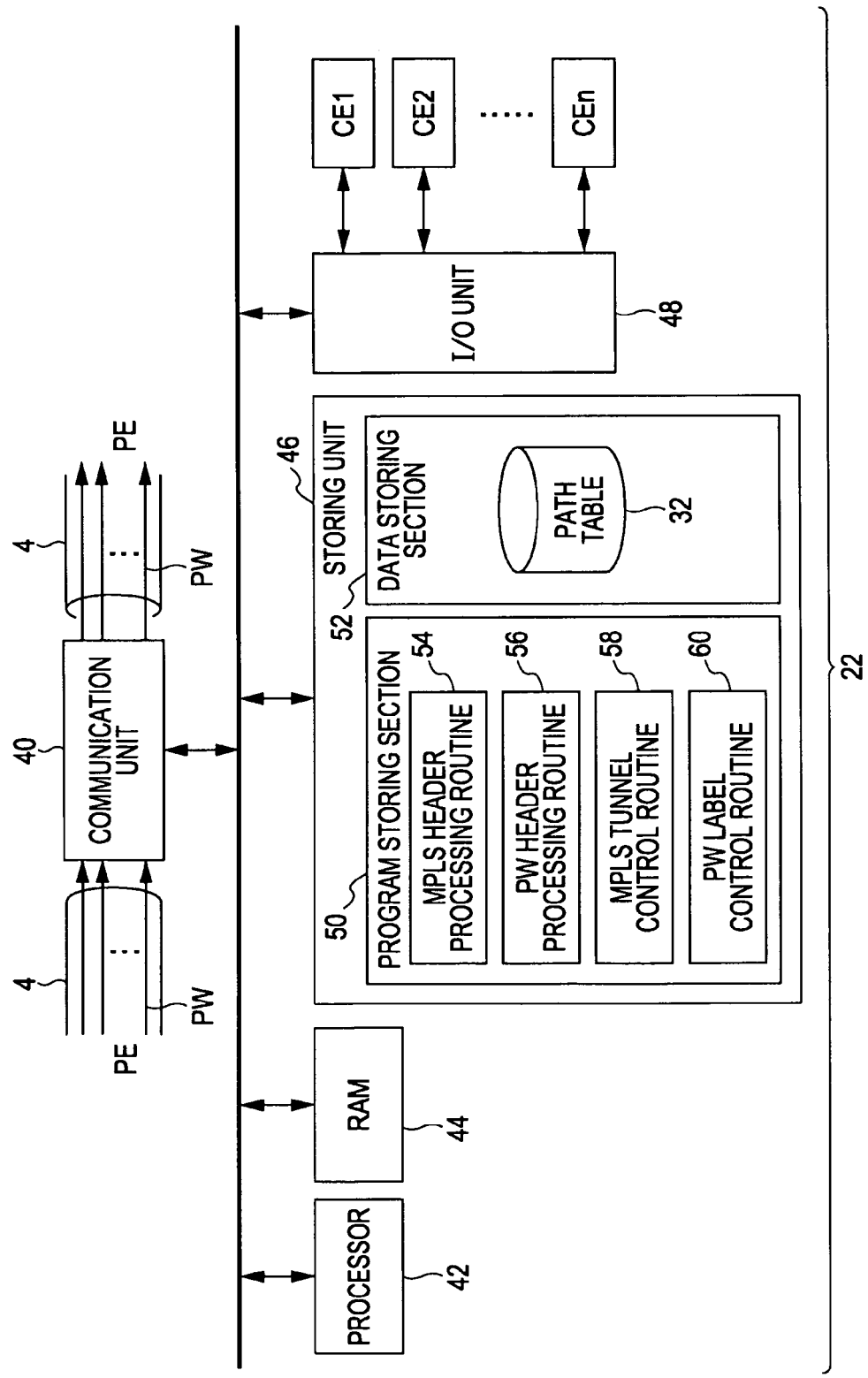
FIG. 8 is a diagram illustrating en example of a hardware configuration of a provider edge, according to an embodiment.

Next, a description will be given of a provider edge (PE) with reference to FIGS. 7 and 8. FIG. 7 is a diagram illustrating an example of a configuration of a provider edge. FIG. 8 is a diagram illustrating en example of a hardware configuration of a provider edge. The configurations depicted in FIG. 7 and 8 are examples and the present invention is not limited to the configurations. Referring to FIGS. 7 and 8, the same reference alpha-numerals as those depicted in FIG. 1 denote the same components.

A PE 22 represents the PE#1, the PE#2, the PE#3, or the PE#4 depicted in FIG. 1, serving as relay means for executing the above-mentioned processing of packet transmission. The PE 22, for example, can be configured to include: a packet receiving unit 24; a packet transmitting unit 26; a header processing unit 28; an MPLS tunnel control unit 30; a path table 32; and a PW label control unit 34.

The packet receiving unit 24 receives a packet transmitted from another PE serving as another relay means. The packet transmitting unit 26 transmits a packet to another PE serving as another relay means. A packet transmitted from the packet transmitting unit 26 may be one created by the PE 22 or received by the packet receiving unit 24.

The header processing unit 28 is means for processing a header part of the packet data. In the case, an MPLS header processing section 36 and a PW header processing section 38 are arranged in the header processing unit 28. The MPLS header processing section 36 is header setting means for setting an MPLS header 14 of packet data (depicted in FIG. 2). The PW header processing section 38 is means for setting a PW header (for example, a PW identifier depicted in FIG. 4) of the packet data. The number of hops N set to the "ttl" field of the header of a packet passing through the tunnel is subtracted by 1 at each of PEs positioned along the tunnel by the header processing unit 28 thereof, and the subtracted value is again set to the "ttl" field of the header of the passing packet. A PE can recognize that the own node may be a PW egress node of the pseudo wire by receiving a packet having the MPLS header in which the value of the "ttl" field equal to 1 is set.

The MPLS tunnel control unit 30 manages the path table 32 by using a routing program, and updates the contents of the path table 32 regarding an MPLS tunnel so as to route packets received or to be transmitted. The path table 32 is a database for storing information indicating MPLS tunnels and pseudo wires. The PW label control unit 34 updates the contents of the path table 32 regarding a pseudo wire so as to route packets received or to be transmitted.

Referring to FIG. 8, the PE 22 can be configured by using a computer, and can be configured to include: a communication unit 40; a processor 42; a RAM (Random Access Memory) 44; a storing unit 46; and an input/output unit 48. The communication unit 40 is communication means for transmitting and receiving packets and can be controlled by the processor 42. The communication unit 40 can be configured to include the packet receiving unit 24 and the packet transmitting unit 26 depicted in FIG. 7.

The processor 42 is control means that includes packet processing means for receiving and transmitting packets and path setting means for setting a pseudo wire as a packet communication path. The processor 42 can be configured by using, for example, a CPU (Central Processing Unit), and can be configured to include function units such as the header processing unit 28, the MPLS tunnel control unit 30, and the PW label control unit 34 depicted in FIG. 7, by executing the programs (routines) stored in the storing unit 46. The RAM 44 can include a work area for arranging an Operating System (OS) and programs. The storing unit 46 is means for storing a program or data, and can be configured to include a program storing section 50 and a data storing section 52.

The program storing unit 50 can store the OS and various programs including an MPLS header processing routine 54, a PW header processing routine 56, an MPLS tunnel control routine 58, and a PW label control routine 60. The MPLS tunnel control routine 58 may include a RRO processing routine for creating path information to be stored in the path table 32. The data storing section 52 stores the database included in the path table 32 of FIG. 7.

The input/output unit 48 is an input/output interface of packet data, and CE1, CE2, . . . CEn are connected thereto as one or more customer edges. The input/output unit 48 outputs the received packet to the CE1, CE2, . . . CEn, and inputs packets transmitted from CE1, CE2, . . . CEn.

Figure 9:
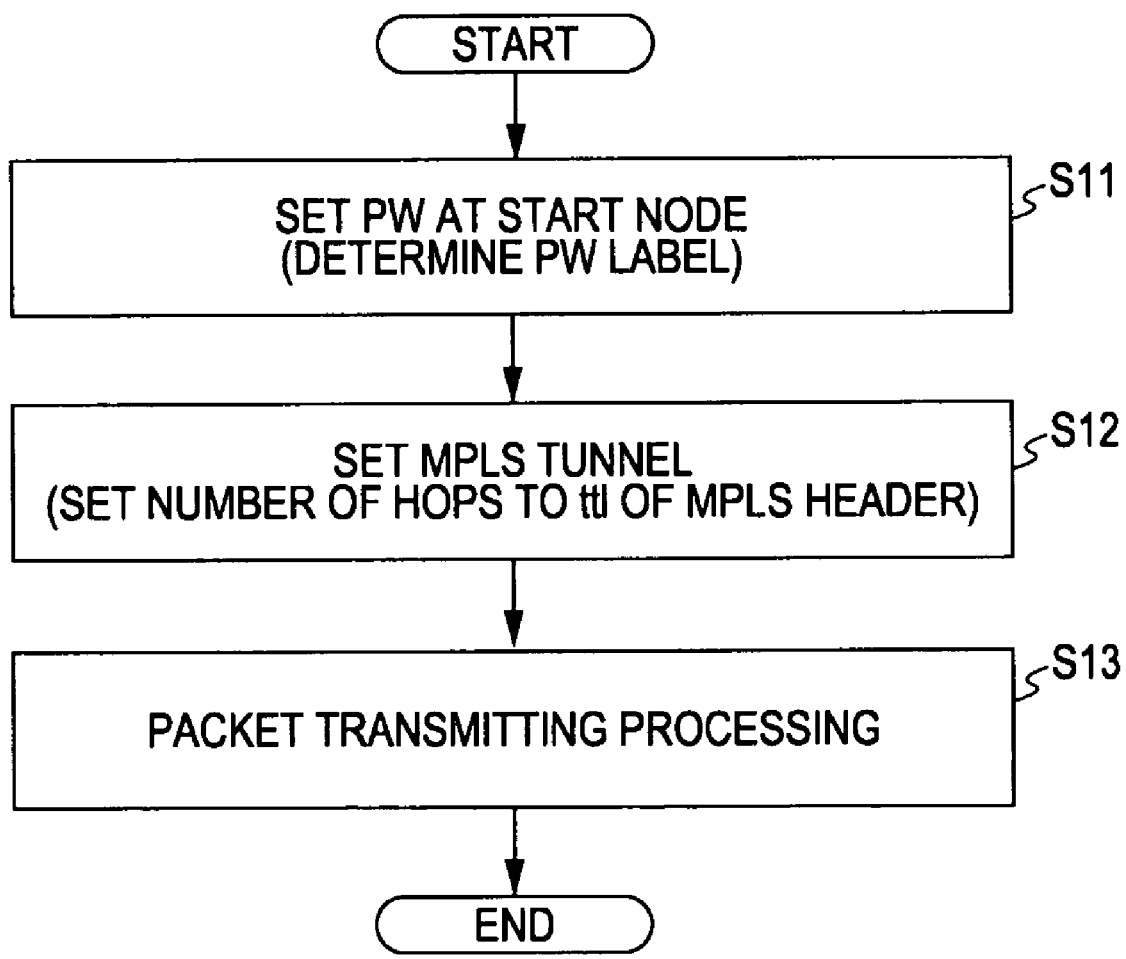
FIG. 9 is a diagram illustrating an example of an operation flowchart for transmitting a packet, according to an embodiment.
Figure 10:
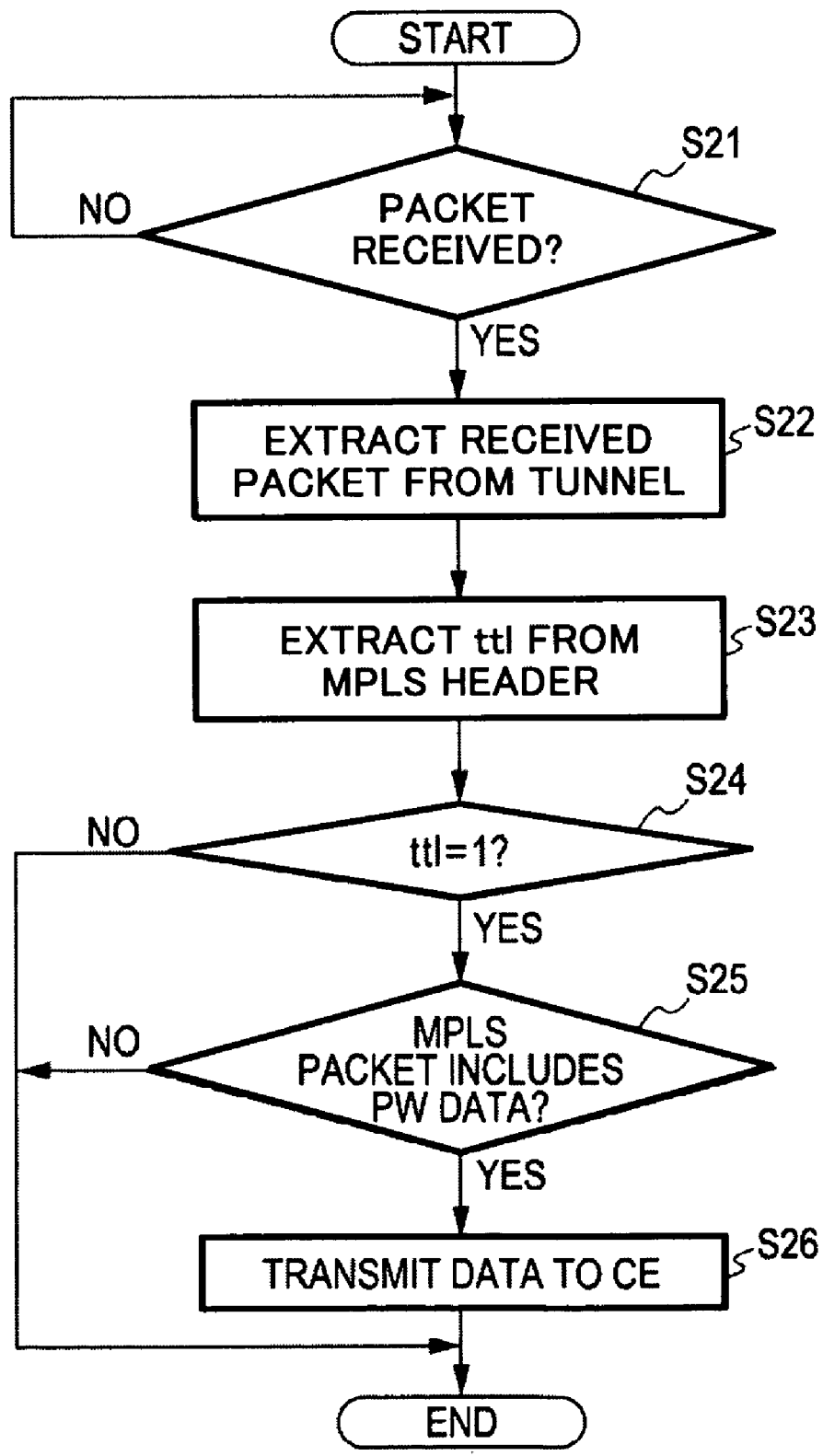
FIG. 10 is a diagram illustrating an example of an operation flowchart for receiving a packet, according to an embodiment.

Next, a description will be given of transmission and reception of packets in the PE with reference to FIGS. 9 and 10. FIG. 9 is a diagram illustrating an example of an operation flowchart for transmitting a packet. FIG. 10 is a diagram illustrating an example of an operation flowchart for receiving a packet. The configurations depicted in FIGS. 9 and 10 are examples, and the present invention is not limited to the configurations.

In the operation flowchart for transmitting packets, referring to FIG. 9, the PW ingress node, sets a pseudo wire PW, that is, determines a PW label, or a PW identifier (in step S11).

After determining the PW label, information on the MPLS tunnel is set (in step S12). In the case, the number of hops is set to the "ttl" field of the MPLS header 14 as a packet arrival identifier.

After the setting mentioned above, transmitting processing of packets is performed (in step S13), and the processing ends.

In the operation flowchart for receiving packets, referring to FIG. 10, when the provider edge PE in the tunnel 4 receives a packet (YES in step S21), the received packet is extracted from the tunnel 4 (in step S22). Then, the "ttl" field is extracted from the MPLS header 14 (in step S23), and it is determined whether or not the extracted "ttl" field is equal to 1 (in step 24).

When the "ttl" field is not equal to 1 (ttl≠1) (NO in step 24), the PE that received the packet is not a PW egress node, and the processing ends. When the "ttl" field is equal to 1 (ttl=1) (YES in step 24), it is checked whether or not the received MPLS packet includes pseudo wire data, i.e., user data is encapsulated as pseudo wire data (in step S25). In the case, whether or not the received MPLS packet includes pseudo wire data can be determined by checking whether or not the received MPLS packet includes a PW identifier 10 depicted in FIG. 2. When the received MPLS packet includes pseudo wire data (YES in step S25), the user data carried by the packet is transmitted to the CE in the downstream direction (in step S26), and the receiving processing ends. When the received MPLS packet does not include pseudo wire data (NO in step S25), receiving processing ends without transmitting user data to a CE.

According to the first embodiment described above, the following features can be implemented.

(1) According to conventional art, a tunnel is set for each pseudo wire, as depicted in FIGS. 23 and 24. On the contrary, according to the embodiment, as depicted in FIG. 1, one tunnel 4 is set and all pseudo wires are multiplexed into the tunnel 4, thereby preventing consumption of excessive bandwidth. That is, according to the embodiment, a method of sharing bandwidth can be realized by multiplexing a plurality of pseudo wires into one tunnel in a packet switched network, such as an MPLS network.

(2) According to the embodiment, since a plurality of pseudo wires are multiplexed into one tunnel, the number of hops is set to the "ttl" field of the MPLS header 14 in order to identify egress nodes of the plurality of pseudo wires. That is, for each of the plurality of pseudo wires, the PW ingress node thereof sets the number of hops from the PW ingress node to the PW egress node thereof, to the "ttl" field of an MPLS header 14 of a packet, and transmits the packet including the MPLS header 14 to the PW egress node thereof through the tunnel 4.

(3) Upon receiving a packet having the MPLS header 14 in which "ttl" field set at "1", a PW egress node along the tunnel 4 extracts the packet from the tunnel 4, and transmits user data included in the packet to a CE in the down stream direction when the received MPLS packet includes a pseudo wire data encapsulating user data. Therefore, the user data can be transmitted to the destination address of the user data without fail. That is, a PW egress node that received a packet having the MPLS header in which "ttl" field is set at "1", extracts the packet from the MPLS tunnel to check whether or not the packet includes pseudo wire data encapsulating user data, and transmits the user data included in the packet to the CE when the packet includes the pseudo wire data.

(4) The ingress node of the tunnel can be configured to add an identifier for identifying the node that assigned a PW label for a pseudo wire. The identifier, for example, may be included in a PW identifier 10 depicted in FIG. 2.

(5) The number of hops set to an MPLS header is the number of hops from the PW ingress node to the PW egress node of a pseudo wire, and obtained by using a RRO in a RSVP-TE signaling message for setting an MPLS tunnel. That is, the number of hops set to the "ttl" field of the MPLS header can be calculated from the RRO information included in the RSVP-TE message.

(6) A packet can be transmitted from an intermediate node of an MPLS tunnel, by inserting the data into the MPLS tunnel as depicted in FIG. 6. That is, according to the embodiment, realized is a method in which date originating from a CE connected to an intermediate node of the MPLS tunnel other than the ingress and egress nodes thereof can be transmitted to other node along the tunnel by inserting the data into the intermediate node of the MPLS tunnel.

(7) As an example, the embodiment can be applied to a VPLS network that has a ring topology and has 4 nodes as depicted in FIG. 24, and the number of nodes may be 5 or more.

[Second Embodiment]

Figure 11:
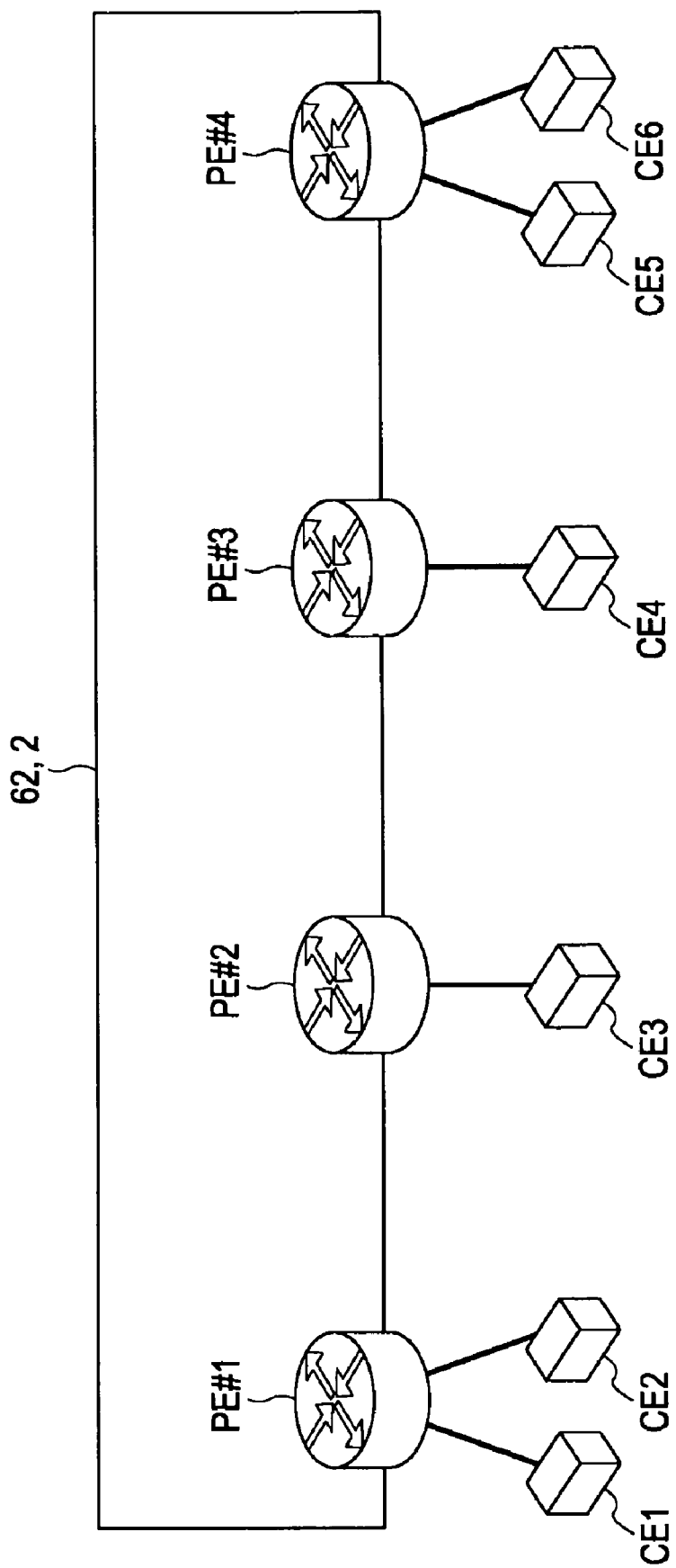
FIG. 11 is a diagram illustrating an example of a configuration of a packet switched network.

According to a second embodiment, a description will be given with reference to FIG. 11. FIG. 11 is a diagram illustrating an example of configuration of a packet switched network. The configuration depicted in FIG. 11 is an example and the present invention is not limited to the configuration. Referring to FIG. 11, the same reference alpha-numerals as those depicted in FIG. 1 denote the same components.

The network 62 is an example of the packet switched network 2, and constitutes a network providing a virtual private LAN service (VPLS). In the case, the network 62 is configured as a ring topology network having 4 nodes therein. Herein, the number of nodes included in the ring network is set at 4 for convenience of explanation, but it can be arbitrary.

In the network 62, four nodes (the PE#1, the PE#2, the PE#3, and the PE#4) are connected each other in a ring topology. Further, the PE#1 is communicably connected to the CE1 and CE2 in the downstream direction thereof, the PE#2 is communicably connected to the CE3 in the downstream direction thereof, the PE#3 is communicably connected to the CE4 in the downstream direction thereof, and the PE#4 is communicably connected to the CE5 and CE6 in the downstream direction thereof, as depicted in FIG. 11. A tunnel and a plurality of pseudo wires can be set on the network 62.

Figure 12:
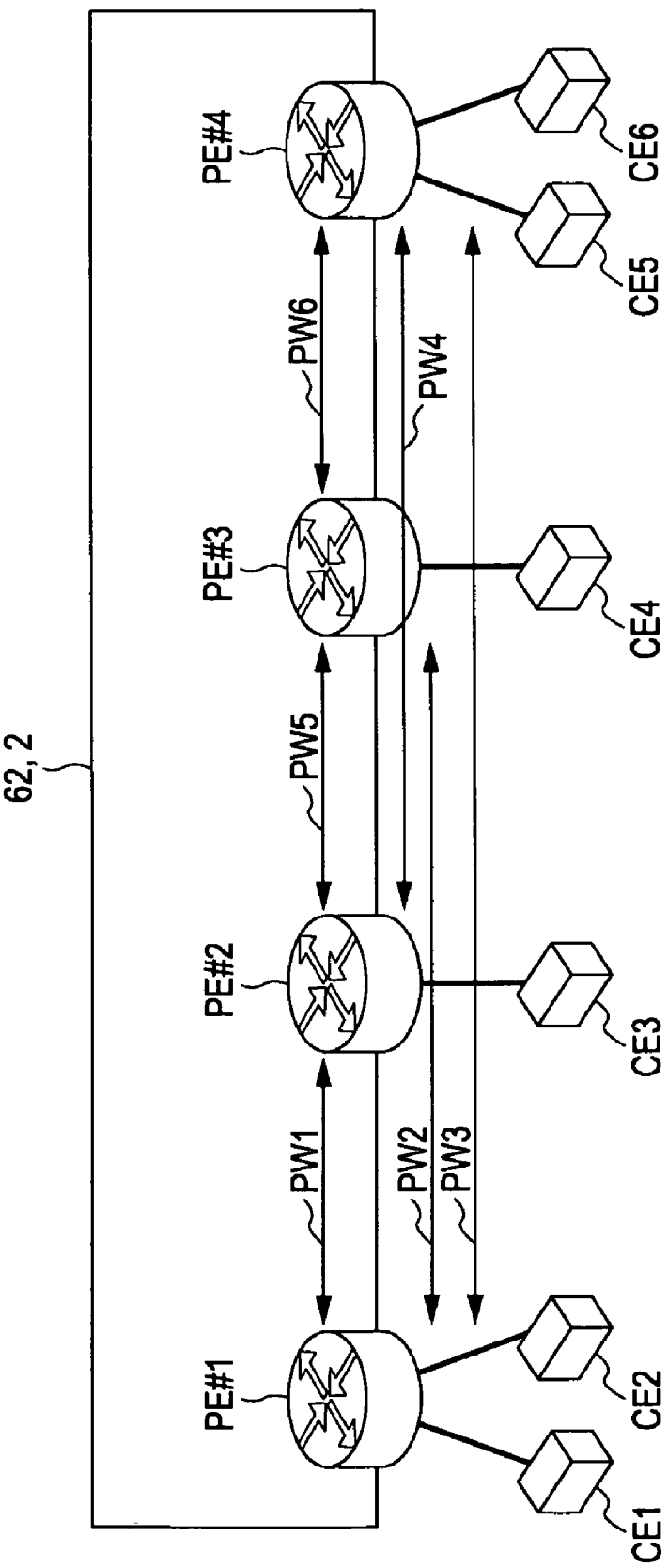
FIG. 12 is a diagram illustrating an example of a plurality of pseudo wires set in a tunnel, according to an embodiment.
Figure 13:
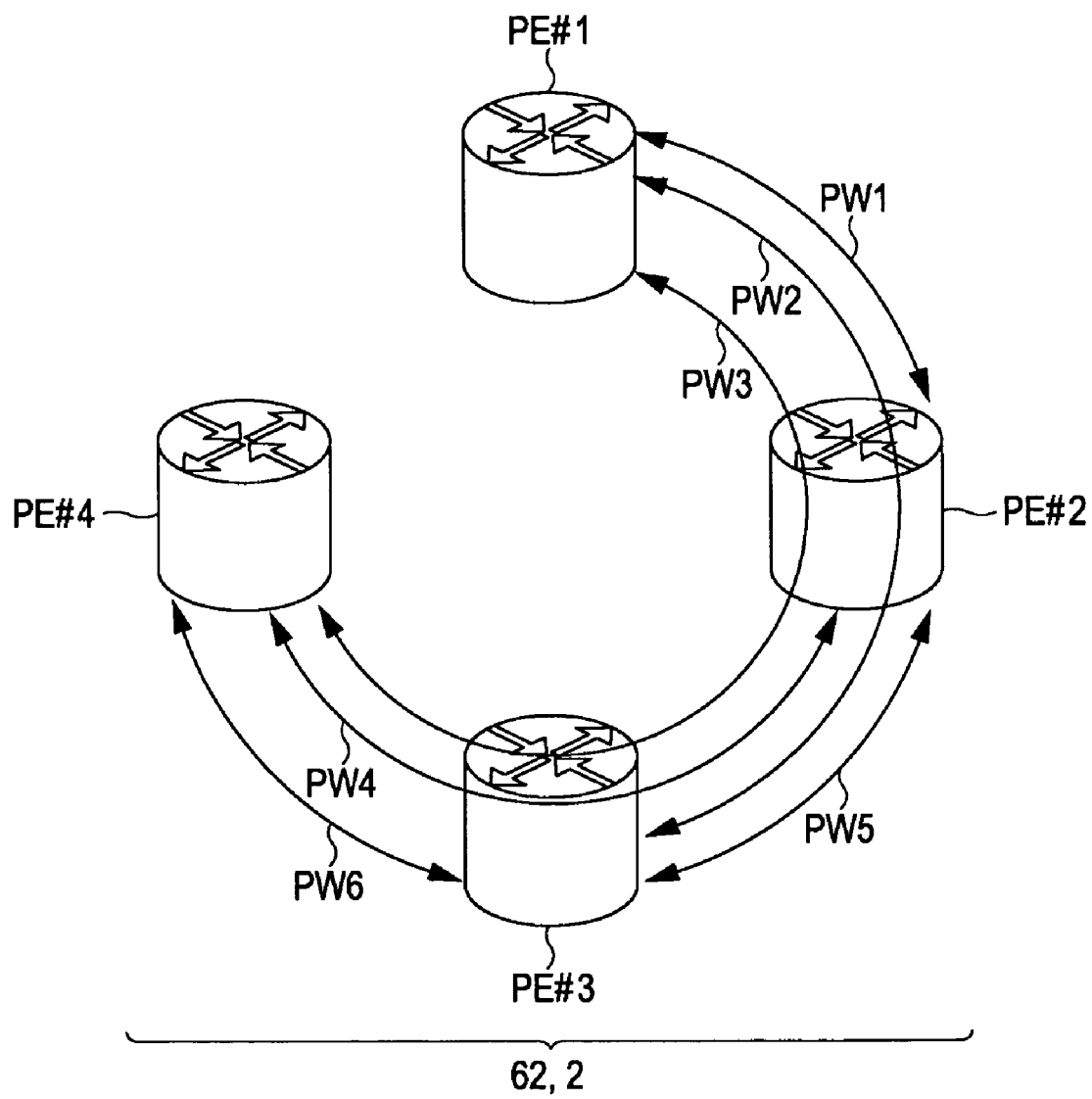
FIG. 13 is a diagram illustrating an example of a plurality of pseudo wires set in a tunnel, according to an embodiment.
Figure 14:
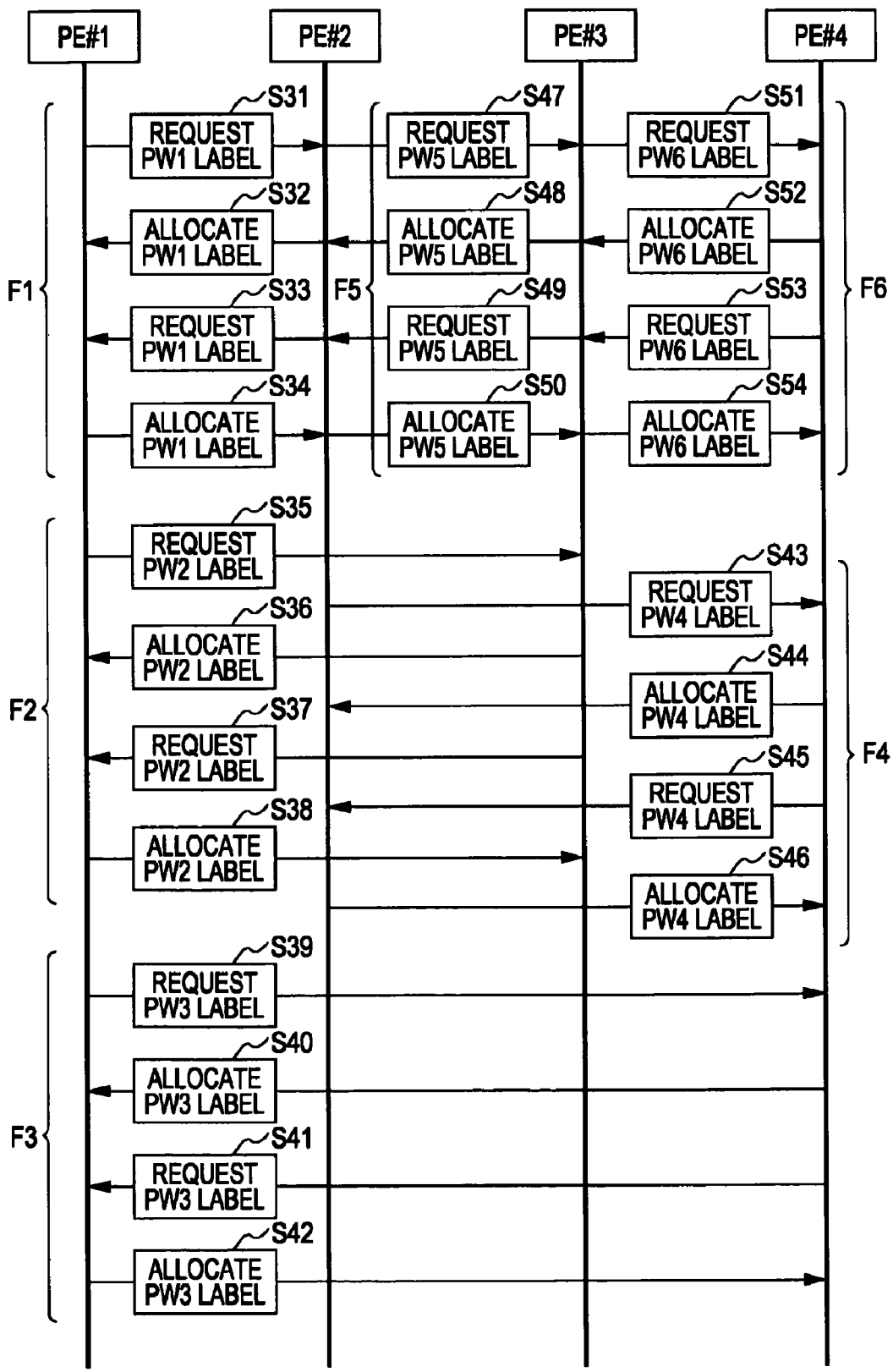
FIG. 14 is a diagram illustrating an example of processing for setting a plurality pseudo wires to a tunnel, according to an embodiment.

A description will be given of setting of a plurality of pseudo wires and a tunnel with reference to FIGS. 12, 13, and 14. FIGS. 12 and 13 are diagrams illustrating examples of a plurality of pseudo wires set to a tunnel. FIG. 14 is a diagram illustrating an example of processing for setting a plurality pseudo wires to a tunnel. The configurations depicted in FIGS. 12 to 14 are examples, and the present invention is not limited to the configurations. Referring to FIGS. 12 to 14, the same reference alpha-numerals as those depicted in FIG. 1 denote the same components.

As depicted in FIGS. 12 and 13, a pseudo wire PW1 is set between the PE#1 and the PE#2, a pseudo wire PW2 is set between the PE#1 and the PE#3, a pseudo wire PW3 is set between the PE#1 and the PE#4, a pseudo wire PW4 is set between the PE#2 and the PE#4, a pseudo wire PW5 is set between the PE#2 and the PE#3, and a pseudo wire PW6 is set between the PE#3 and the PE#4.

As an example of a method and program for setting a plurality pseudo wires to a tunnel, sequences of processing are depicted in FIG. 14.

Referring to FIG. 14, a reference alpha-numeral F1 represents a sequence of processing for allocating a label for PW1 (PW1 label) between the PE#1 and the PE#2. First, a request of the PW1 label is issued from the PE#1 to the PE#2 (in step S31), and the PW1 label is allocated from the PE#2 to the PE#1 in response to the request (in step S32). Next, a request of the PW1 label is issued from the PE#2 to the PE#1 (in step S33), and the PW1 label is allocated from the PE#1 to the PE#2 in response to the request (in step S34).

A reference alpha-numeral F2 represents a sequence of processing for allocating a label for PW2 (PW2 label) between the PE#1 and the PE#3. First, a request of the PW2 label is issued from the PE#1 to the PE#3 (in step S35), and the PW2 label is allocated from the PE#3 to the PE#1 in response to the request (in step S36). Next, a request of the PW2 label is issued from the PE#3 to the PE#1 (in step S37), and the PW2 label is allocated from the PE#1 to the PE#3 in response to the request (in step S38).

A reference alpha-numeral F3 represents a sequence of processing for allocating a label for PW3 (PW3 label) between the PE#1 and the PE#4. First, a request of a PW3 label is issued from the PE#1 to the PE#4 (in step S39), and the PW3 label is allocated from the PE#4 to the PE#1 in response to the request (in step S40). Next, a request of the PW3 label is issued from the PE#4 to the PE#1 (in step S41), and the PW3 label is allocated from the PE#1 to the PE#4 in response to the request (in step S42).

A reference alpha-numeral F4 represents a sequence of processing for allocating a label for PW4 (PW4 label) between the PE#2 and the PE#4. First, a request of the PW4 label is issued from the PE#2 to the PE#4 (in step S43), and the PW4 label is allocated from the PE#4 to the PE#2 in response to the request (in step S44). Next, a request of the PW4 label is issued from the PE#4 to the PE#2 (in step S45), and the PW4 label is allocated from the PE#2 to the PE#4 in response to the request (in step S46).

A reference alpha-numeral F5 represents a sequence of processing for allocating a label for PW5 (PW5 label) between the PE#2 and the PE#3. First, a request of the PW5 label is issued from the PE#2 to the PE#3 (in step S47), and the PW5 label is allocated from the PE#3 to the PE#2 in response to the request (in step S48). Next, a request of the PW5 label is issued from the PE#3 to the PE#2 (in step S49), and the PW5 label is allocated from the PE#2 to the PE#3 in response to the request (in step S50).

A reference alpha-numeral F6 represents a sequence of processing for allocating a label for PW6 (PW6 label) between the PE#3 and the PE#4. First, a request of the PW6 label is issued from the PE#3 to the PE#4 (in step S51), and the PW6 label is allocated from the PE#4 to the PE#3 in response to the request (in step S52). Next, a request of the PW6 label is issued from the PE#4 to the PE#3 (in step S53), and the PW6 label is allocated from the PE#3 to the PE#4 in response to the request (in step S54).

Figure 15:
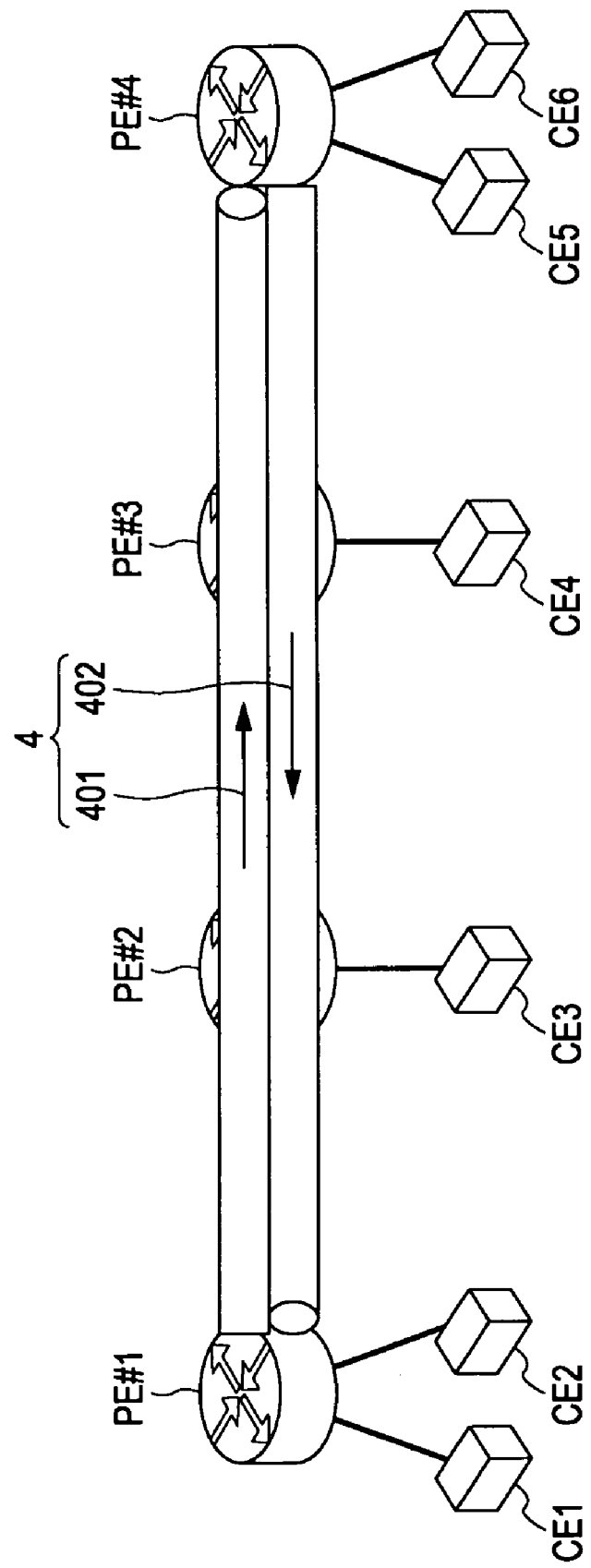
FIG. 15 is a diagram illustrating an example of processing for setting a tunnel.
Figure 16:
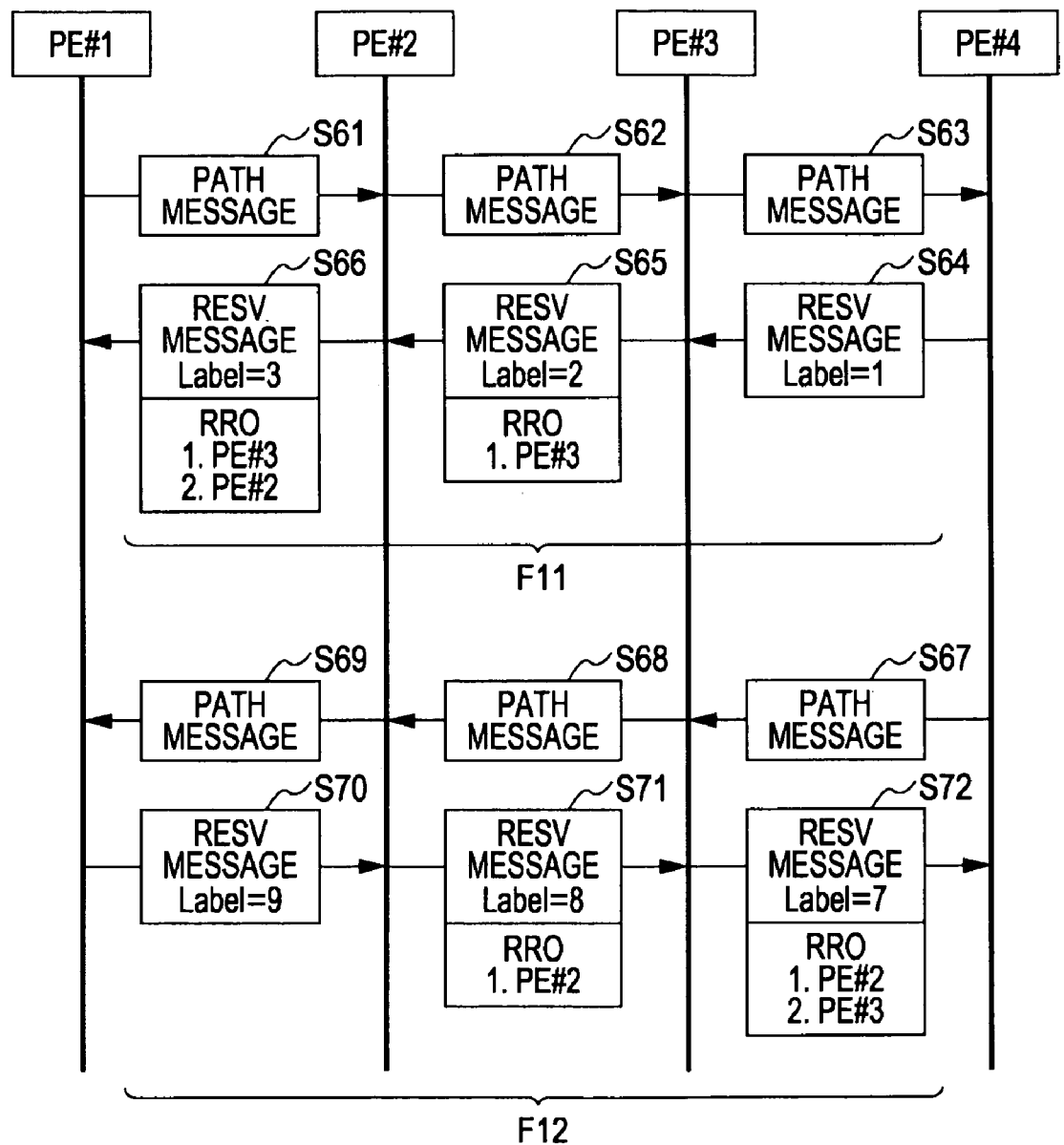
FIG. 16 is a diagram illustrating an example of a sequence of processing for setting a tunnel, according to an embodiment.

Next, a description will be given of the setting of an MPLS tunnel with reference to FIGS. 15 and 16. FIG. 15 is a diagram illustrating an example of a procedure for setting an MPLS tunnel. FIG. 16 is a diagram illustrating an example of a sequence of processing for setting the MPLS tunnel. The configurations depicted in FIGS. 15 and 16 are examples, and the present invention is not limited to the configurations. Referring to FIGS. 15 and 16, the same reference alphanumerals as those shown in FIG. 1 denote the same components.

According to the second embodiment, as depicted in FIG. 15, two tunnels 401 and 402 each having different direction are set up between the PE#1 and the PE#4. When setting up a tunnel 401 in the direction from the PE#1 to the PE#4, a PATH message is transmitted from the PE#1 to the PE#4, and an MPLS label is distributed in the direction from the PE#4 to the PE#1 by a RESV message. When setting up a tunnel 402 in the direction from the PE#4 to the PE#1, a PATH message is transmitted from the PE#4 to the PE#1, and an MPLS label is distributed in the direction from the PE#1 to the PE#4 by a RESV message. Further, information on nodes along the tunnel can be recorded in the above-mentioned record route object (RRO) of the RESV message, as described bellow.

As an example of a method and program for setting a tunnel to a packet switched network, two sequences of processing are depicted in FIG. 16.

Referring to FIG. 16, the two sequences of processing includes a sequence of processing F11 for setting the tunnel 401 and a sequence of processing F12 for setting the tunnel 402.

In the sequence of processing F11 for setting the tunnel 401, first, a PATH message is transmitted from the ingress node PE#1 of the tunnel 401 to the egress node PE#4 thereof through the intermediate nodes: PE#2 and PE#3. That is, the ingress node PE#1 sends a PATH message to the PE#2 (in step S61), the PE#2 sends a PATH message to the PE#3 in response to the received PATH message (in step S62), and the PE#3 sends a PATH message to the egress node PE#4 in response to the received PATH message (in step S63). Next, in response to the PATH message, the egress node PE#4 sends back a RESV message including MPLS label information to the PE#3. That is, the egress node PE#4 sends back to the PE#3 the RESV message in which, for example, the MPLS label information is set at "1" to identify the tunnel 401 depicted in FIG. 15 (in step S64).

The PE#3 that received the RESV message from the egress node PE#4 sends to the PE#2 the RESV message in which, for example, the MPLS label information is set at "2" to identify the tunnel 401 depicted in FIG. 15 and "1.PE#3" is set to the RRO field of the RESV message to indicate a node sequence to be connected by the tunnel 401 (in step S65).

The PE#2 that received the RESV message from the node PE#3 sends to the ingress node PE#1 the RESV message in which, for example, the MPLS label information is set at "3" to identify the tunnel 401 depicted in FIG. 15 and "1.PE#3, 2.PE#2" is set to the RRO field of the RESV message to indicate a node sequence to be connected by the tunnel 401 (in step S66).

After the sequence of processing F11 has completed, a sequence of processing F12 for setting a tunnel 402 is performed. In the case of the tunnel 402, the node PE#4 becomes an ingress node thereof, and the node PE#1 becomes an egress node thereof.

In the sequence of processing F12, firstly, a PATH message is transmitted from the ingress node PE#4 of the tunnel 402 to the egress node PE#1 thereof through the intermediate nodes: PE#3 and PE#2. That is, the ingress node PE#4 sends the PATH message to the PE#3 (in step S67), the PE#3 sends a PATH message to the PE#2 in response to the received PATH message (in step S68), and the PE#2 sends a PATH message to the egress node PE#1 in response to the received PATH message (in step S69). Next, in response to the PATH message, the egress node PE#1 sends back a RESV message including MPLS label information to the PE#2. That is, the egress node PE#1 sends back to the PE#2 the RESV message in which, for example, the MPLS label information is set at "9" to identify the tunnel 402 depicted in FIG. 15 (in step S70).

The PE#2 that received the RESV message from the egress node PE#1 sends to the PE#3 the RESV message in which, for example, MPLS label information is set at "8" to identify the tunnel 402 depicted in FIG. 15 and "1.PE#2" is set to the RRO field of the RESV message to indicate a node sequence to be connected by the tunnel 402 (in step S71).

The PE#3 that received the RESV message from the node PE#2 sends to the ingress node PE#4 the RESV message in which, for example, MPLS label information is set at "7" to identify the tunnel 402 depicted in FIG. 15 and "1.PE#2, 2.PE#3" is set to the RRO field of the RESV message to indicate a node sequence to be connected by the tunnel 401 (in step S72).

According to the method described above, two tunnels 401 and 402 each having different direction can be set, and a direction of transmission of each of the two tunnels can be identified by the setting information (MPLS label information) of a provider edge.

Figure 18:
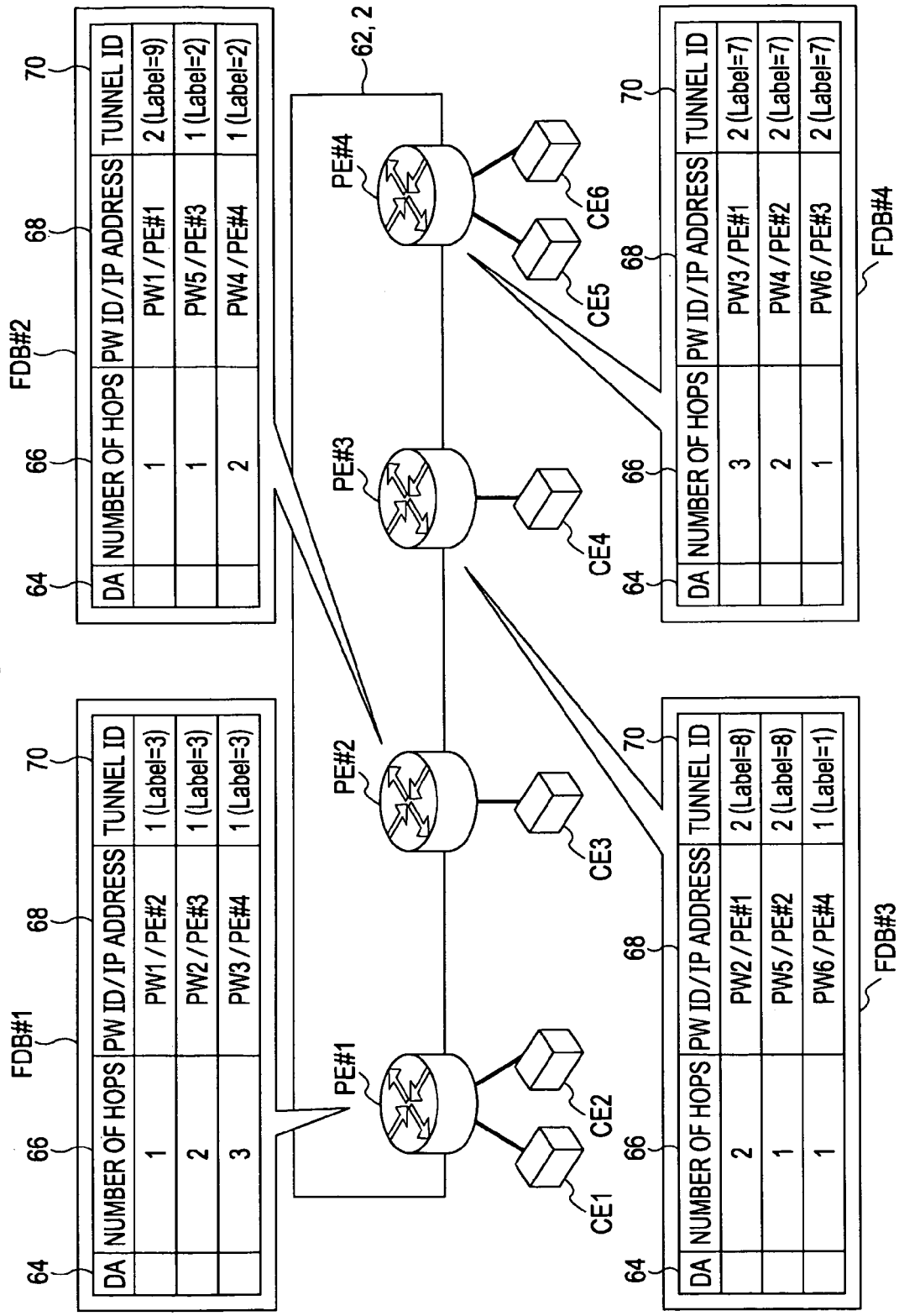
FIG. 18 is a diagram illustrating an example of correlation among pieces of path information each held in a provider edge positioned along a tunnel.

Next, a description will be given of path information with reference to FIGS. 17 and 18. FIG. 17 is a diagram illustrating an example of a configuration of path information. FIG. 18 is a diagram illustrating an example of correlation among pieces of path information each held in a provider edge positioned along a tunnel. The configurations depicted in FIGS. 17 and 18 are examples and the present invention is not limited to the configurations. Referring to FIGS. 17 and 18, the same reference alpha-numerals depicted in FIG. 1 denote the same components.

As path information for identifying a communication path in a packet switched network, for example, a path table 32 depicted in FIG. 17 can be set to each of the nodes: PE#1, PE#2, PE#3, and PE#4. In FIG. 17, a forwarding database (FDB) indicating path information that is stored in the PE#1 after setting both the tunnels and pseudo wires is depicted, as a representative example of a path table 32.

As depicted in FIG. 17, each entry of a path table 32 (or a FDB 32) includes fields: DA 64, the number of hops 66, a PW ID/IP address 68, and tunnel ID 70. A destination address information included in an incoming packet is stored in the DA 64 field, and the number of hops is stored in the number of hops 66 field. Further, an identifier of a pseudo wire and an IP address of a provider edge are stored in the PW ID/IP address 68 field. An identifier identifying a tunnel, i.e., MPLS label information is stored in the tunnel ID 70 field. In the case, MPLS label information set by the sequence of processing F11 for the tunnel 401 depicted in FIG. 16 is expressed as "1(Label=x)" where x is an MPLS label value 1, 2, or 3, and MPLS label information set by the sequence of processing F12 for the tunnel 402 depicted in FIG. 16 is expressed as "2(Label=y)" where y is an MPLS label value 7, 8, or 9.

In FIG. 17, for example, values "PW1/PE#2" or "PW2/PE#3" can be set to the PW ID/IP address 68 field, where alpha-numerals "PW1","PE#2","PW2", and "PE#3" correspond to reference alpha-numerals depicted in FIGS. 12 and 13.

In FIG. 18, FDB#1, FDB#2, FDB#3, and FDB#4 are path tables 32 held in the PE#1, the PE#2, the PE#3, and the PE#4, respectively. In the case, FIG. 18 illustrates path tables (FDBs) in a state before receiving a packet to be transmitted through a plurality of pseudo wires. Therefore, the destination address of the packet, that is, the address of a CE connected to a PW egress node of a pseudo wire through which the packet transmitted is not learnt yet, and DA 64 fields are null at this point. Fields in a path table 32 (FDB) in FIG. 18 other than DA 64 fields are set at the same values used in the examples depicted in FIGS. 12-16.

The FDB#1 has three entries, and the number of hops "1", "2", and "3" are set to the number of hop 66 fields of respective entries thereof. In the entry having "1" as the number of hops 66, "PW1/PE#2" is set to the PW ID/IP address 68 field, and "1(Label=3)" is set to the tunnel ID 70 field. In the entry having "2" as the number of hops 66, "PW2/PE#3" is set to the PW ID/IP address 68 field, and "1(Label=3)" is set to the tunnel ID 70 field. In the entry having "3" as the number of hops 66, "PW3/PE#4" is set to the PW ID/IP address 68 field, and "1(Label=3)" is set to the tunnel ID 70 field.

The FDB#2 has three entries in which "1", "1", and "2" are set to the number of hops 66 fields, "PW1/PE#1", "PW5/PE#3", and "PW4/PE#4" are set to the PW ID/IP address 68 fields, and "2(Label=9)", "1(Label=2)", and "1(Label=2)" are set to the tunnel ID 70 fields, respectively.

The FDB#3 has three entries in which "2", "1", and "1" are set to the number of hops 66 fields, "PW2/PE#1", "PW5/PE#2", and "PW6/PE#4" are set to the PW ID/IP address 68 fields, and "2(Label=8)", "2(Label=8)", and "1(Label=1)" are set to the tunnel ID 70 fields, respectively.

The FDB#4 has three entries in which "3", "2", and "1" are set to the number of hops 66 fields, "PW3/PE#1", "PW4/PE#2", and "PW6/PE#3" are set to the PW ID/IP address 68 fields, and "2(Label=7)", "2(Label=7)", and "2(Label=7)" are set to the tunnel ID 70 fields, respectively.

Figure 19:
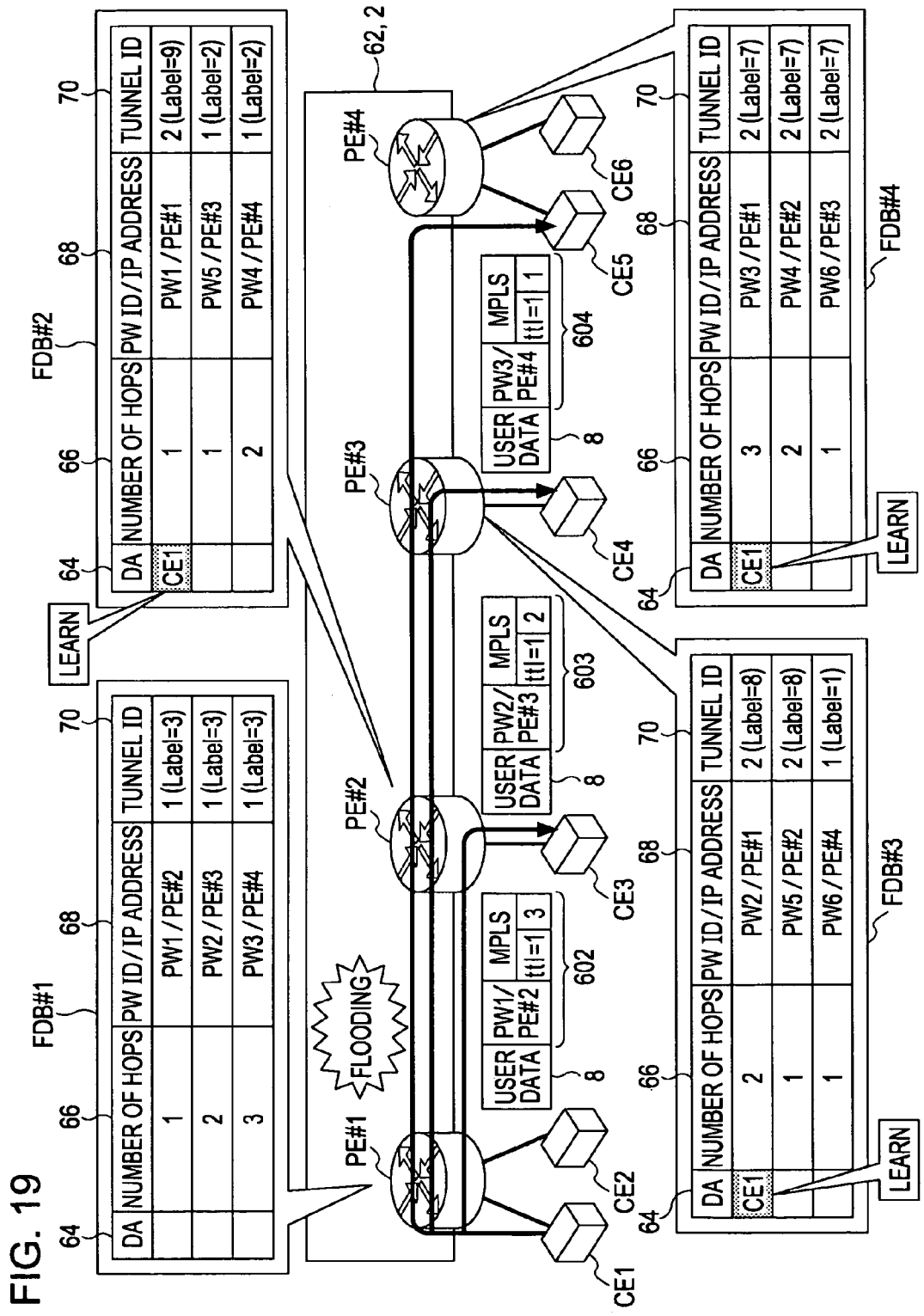
FIG. 19 is a diagram illustrating an example of processing on a packet transmitted from the CE1 to the CE5, according to an embodiment.
Figure 20:
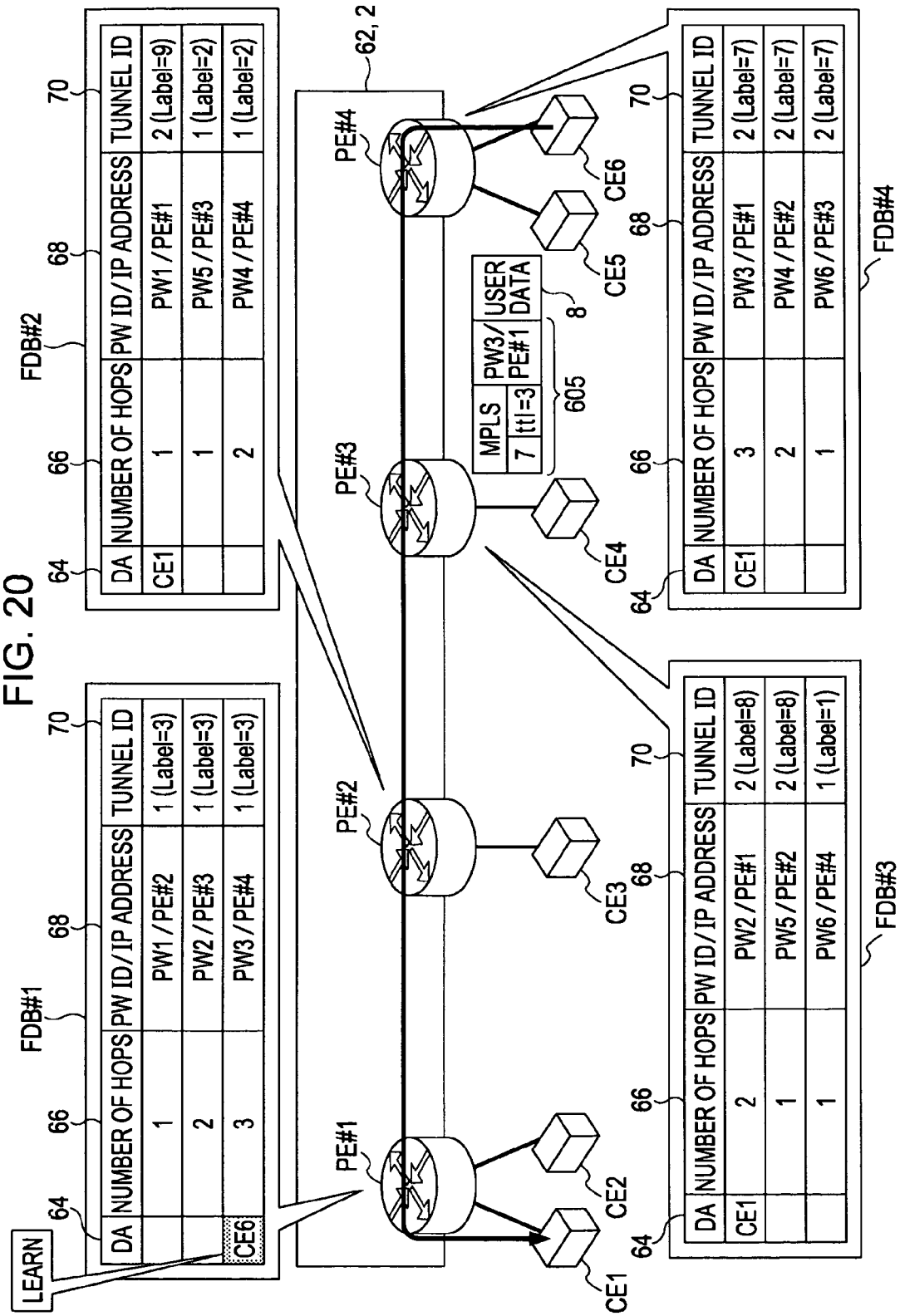
FIG. 20 is a diagram illustrating an example of processing on a packet transmitted from the CE6 to CE1, according to an embodiment.
Figure 21:
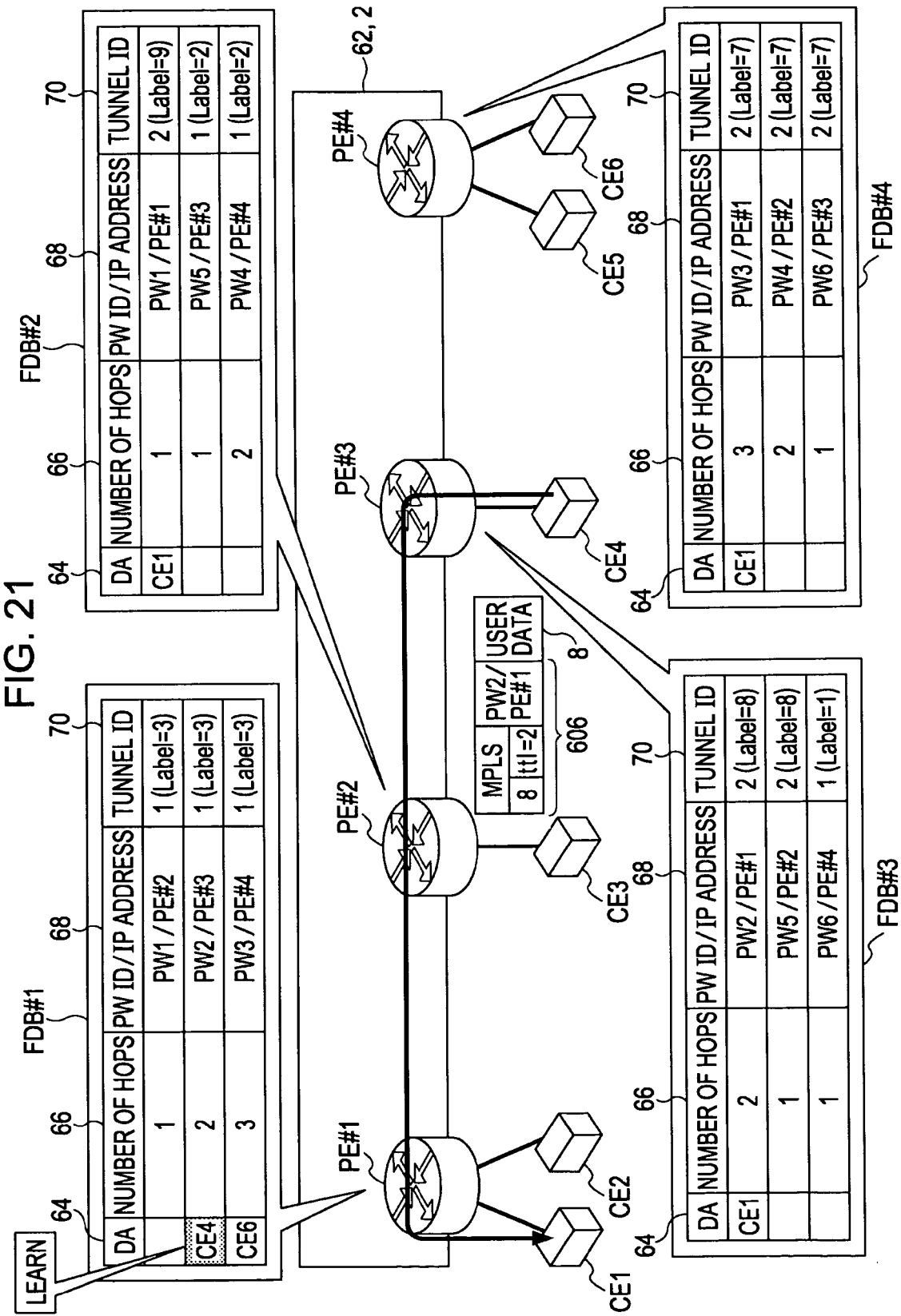
FIG. 21 is a diagram illustrating an example of processing on a packet transmitted from the CE4 to CE1, according to an embodiment.
Figure 22:
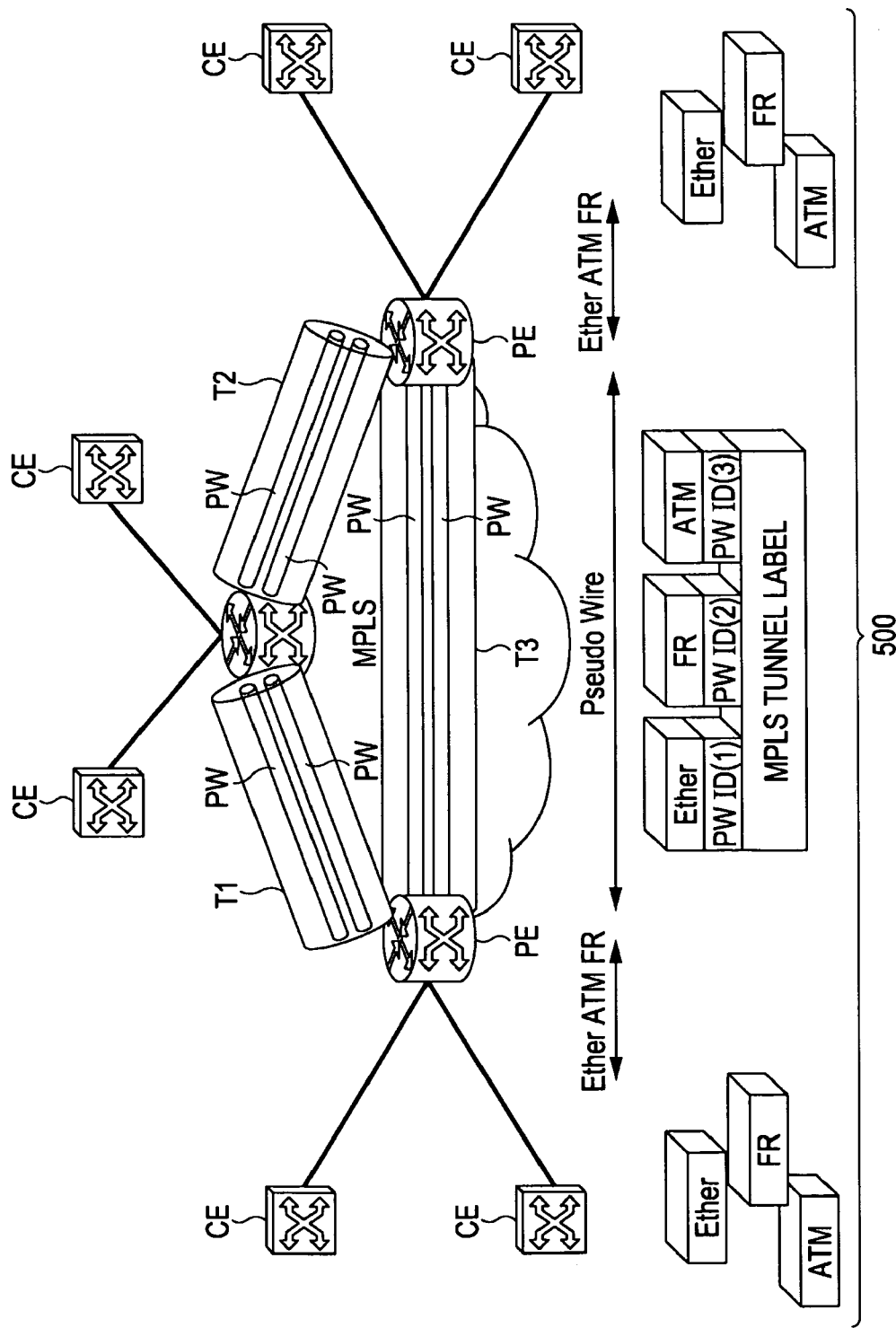
FIG. 22 is an explanatory diagram illustrating an example of a virtual private LAN service (VPLS)

Next, a description will be given of packet processing with reference to FIGS. 19, 20, and 21. FIG. 19 is a diagram illustrating an example of processing on a packet transmitted from the CE1 to the CE5. FIG. 20 is a diagram illustrating an example of processing on a packet transmitted from the CE6 to CE1. FIG. 21 is a diagram illustrating an example of processing on a packet transmitted from the CE4 to CE1. The configurations depicted in FIGS. 19, 20, and 21 are examples, and the present invention is not limited to the configurations. Referring to FIGS. 19 to 21, the same reference alpha-numerals as those depicted in FIG. 1 denote the same component.

(1) Processing on a Packet Transmitted from CE1 to CE5

Referring to FIG. 19, in the processing on a packet transmitted from CE1 to CE5, the PE#1 has not yet learnt information on the address of the CE5. Therefore, in the case, the PE#1 transmits packet data, at the same time, to the all nodes: the PE#2, the PE#3, and the PE#4 (called Flooding). When receiving a packet having an MPLS header in which "ttl=1" is set, each of the PE#2, the PE#3, and the PE#4 does not transmit the received packet data to the next node along the tunnel. That is, in the case, the PE#2, the PE#3, and the PE#4 do not transmit the received packets to the PE#3, the PE#4, and the PE#1, respectively. Instead, when a pseudo wire data is included in the received packet, user data encapsulated in the received packet is transmitted to one of CEs connected to the PE. Further, each of the PE#2, the PE#3, and the PE#4 learns information on the address of the CE1 from the received packet. As a consequence, the address information included in the received packet is stored in the DA 64 field of the corresponding entry of each of the FDB#2, the FDB#3, and the FDB#4. In this case, the address information of the CE1 learned from the received packet is stored in the DA 64 fields.

The PE#2 receives the packet from the PE#1. The received packet includes a user data 8 and a header 602 in which "PW1/PE#2" is set as a PW identifier 10 depicted in FIG. 2, and "ttl=1" and "Label=3" are set as an MPLS header 14 depicted in FIG. 2. "PW1/PE#2" set as a PW identifier 10 of the header 602 means that the PW1 is used as a pseudo wire and the PW egress node of the PW1 is the PE#2. "Label=3" set to the MPLS header 14 of the header 602 corresponds to the RESV message from the PE#2 (in step S66 in FIG. 16), indicating that the tunnel 401 (as depicted in FIG. 15) is used as a tunnel.

The PE#3 receives the packet from the PE#1. The received packet includes a user data 8 and a header 603 in which "PW2/PE#3" is set as a PW identifier 10, and "ttl=1" and "Label=2" are set as an MPLS header 14. "PW2/PE#3" set as a PW identifier 10 of the header 603 means that the PW2 is used as a pseudo wire and the PW egress node of the PW2 is the PE#3. "Label=2" set to the MPLS header 14 of the header 603 corresponds to the RESV message from the PE#3 (in step S65 in FIG. 16), indicating that the tunnel 401 (as depicted in FIG. 15) is used as a tunnel.

Further, the PE#4 receives the packet from the PE#1, and the received packet includes a user data 8 and a header 604 in which "PW3/PE#4" is set as a PW identifier 10 of the header 604, and "ttl=1" and "Label=1" are set to an MPLS header 14. "PW3/PE#4" set as a PW identifier 10 of the header 604 means that the PW3 is used as a pseudo wire and the PW egress node of the PW3 is the PE#4. "Label=1" set to the MPLS header 14 of the header 604 corresponds to the RESV message from the PE#4 (in step S64 in FIG. 16), indicating that the tunnel 401 (as depicted in FIG. 15) is used as a tunnel.

(2) Processing on a Packet Transmitted from the CE6 to CE1

In the case of transmitting a packet from the CE6 to the CE1 in the above-mentioned state depicted in FIG. 19, the PE#4 can transmit a packet to the CE1 as a unicast packet as depicted in FIG. 20 since the PE#4 has already leaned the address of the CE1. Upon receiving the packet, the PE#1 extracts user data from the received packet and transmits the extracted user data to the CE1 since the received packet includes pseudo wire data. Further, at this time, the PE#1, learns the address information on the CE6 from the received packet, and sets "CE6" indicating the learned address information of the CE6 to the DA 64 field of the corresponding entry of FDB#1 held in the PE#1. In the case, the packet transmitted from the CE6 to the CE1 includes the user data 8 and the header 605 in which "PW3/PE#1" is set as a PW identifier 10 of the header 605, and "ttl=3" and "Label=7" are set to the MPLS header 14 thereof. "PW3/PE#1" set as a PW identifier 10 of the header 605 means that the PW3 is used as a pseudo wire and the PW egress node of the PW3 is the PE#1. "Label=7" set to the MPLS header 14 of the header 605 corresponds to the RESV message from the PE#4 (in step S72 in FIG. 16), indicating that the tunnel 402 (depicted FIG. 15) is used as a tunnel.

(3) Processing on a Packet Transmitted from the CE4 to CE1

In the case of transmitting a packet from the CE4 to the CE1 in the above-mentioned state depicted in FIG. 20, the PE#3 can transmit the packet to the CE1 as a unicast packet as depicted in FIG. 21 since the PE#3 has already leaned the address of the CE1. Upon receiving the packet, the PE#1 extracts user data from the received packet and transmits the user data to the CE1 since the received packet includes a pseudo wire data. Further, at this time, the PE#1, learns the address information on the CE4 from the received packet.

In the case, the packet transmitted from the CE4 to the CE1 includes the user data 8 and the header 606 in which "PW2/PE#1" is set as a PW identifier 10, and "ttl=2" and "Label=8" are set to the MPLS header 14 threof. "PW2/PE#1" means that the PW2 is used as a pseudo wire and the PW egress node of the PW2 is the PE#1. "Label=8" set to the MPLS header 14 of the header 606 corresponds to the RESV message from the PE#2 (in step S71 in FIG. 16), indicating that the tunnel 402 (as depicted in FIG. 15) is used as a tunnel.

As will be obvious according to the second embodiment, transmission paths between nodes can be configured by providing a plurality of pseudo wires for the single tunnel 4 so as to share the bandwidth among the plurality of pseudo wires. As a result, the bandwidth can be efficiently used, preventing excessive usage of the bandwidth. In addition, the same advantages as those according to the first embodiment can be obtained.

[Other Embodiments]

According to the first and second embodiments, the PE#1, the PE#2, the PE#3, and the PE#4 that are configured by computers are described as path setting means that sets up, as a transmission path of a packet, a pseudo wire having, as the PW ingress node and PW egress node thereof, a pair of nodes positioned along a tunnel connecting three or more nodes. However, another device that is different from node devices such as the PE#1, the PE#2, the PE#3, and the PE#4 positioned along the tunnel, for example, a server for managing nodes in a packet switched network can be configured to include path setting means according to the embodiment. The present invention is not limited to the configuration according to the embodiment.

According to the first embodiment, a linearly-connected network is described as an example. According to the second embodiment, a ring network is described as an example. However, the present invention can be applied to various networks such as the linear one, ring one, mesh one, and radial one, and cannot be limited to the embodiment.

According to the embodiment, in order to briefly describe that a plurality of pseudo wires can be set to a single tunnel, the tunnel 4 is described as a representative example of tunnels. The present invention is not limited to the configuration in which the number of tunnels is 1. A plurality of tunnels may be provided and a plurality of pseudo wires may be set to each of the plurality of tunnels. The present invention is not limited to the configuration in which the number of tunnels is one.

What is claimed is:

1. An apparatus for transmitting a packet through a tunnel communicably coupling a plurality of nodes in a packet switched network, the apparatus serving as one of the plurality of nodes, the apparatus comprising:
a processor to:
set a first pseudo wire defined as a communication path communicably coupling the apparatus and an end node within the tunnel,
input a first packet from outside the tunnel,
set a packet arrival identifier having an initial value to the first packet, the initial value identifying the end node from which the first packet is to be outputted from the tunnel to outside the tunnel, and
transmit the first packet including the packet arrival identifier having the initial value through the first pseudo wire so that the end node selects, from among packets being transmitted through a plurality of pseudo wires being set within the tunnel, based on the packet arrival identifier, first one or more packets that are to be outputted from the tunnel to outside the tunnel at the end node; and
a memory to store information on the tunnel and a plurality of pseudo wires being set within the tunnel.

2. The apparatus of claim 1,
wherein the processor:
sets, to the first packet, a pseudo wire identifier having a first value identifying the first pseudo wire, and
transmits, through the first pseudo wire, the first packet including the packet arrival identifier having the initial value and the pseudo wire identifier having the first value so that the end node selects, from among the first one or more packets, based on the pseudo wire identifier, the first packet transmitted through the first pseudo wire.

3. The apparatus of claim 2, wherein the processor is further configured to select, from among packets being transmitted through the plurality of pseudo wires within the tunnel, second one or more packets that are to be outputted from the tunnel to outside the tunnel at the apparatus, based on the packet arrival identifier included in each of the second one or more packets, the packet arrival identifier taking on a predetermined value when the each of the second one or more packets is to be outputted from the tunnel to outside the tunnel at the apparatus.

4. The apparatus of claim 3, wherein the processor selects, from among the second one or more packets, a second packet transmitted through a second pseudo wire included in the plurality of pseudo wires, based on the pseudo wire identifier included in each of the second one or more packets, the pseudo wire identifier of the second packet having a second value identifying the second pseudo wire when the second packet is transmitted through the second pseudo wire.

5. The apparatus of claim 1, wherein the processor is configured to set, as the initial value of the packet arrival identifier, a number of nodes through which the first packet passes during transmission from the apparatus to the end node.

6. An apparatus for transmitting a packet through a tunnel communicably coupling a plurality of nodes in a packet switched network, the apparatus serving as one of the plurality of nodes, the apparatus comprising:
a memory to store information on the tunnel and a plurality of pseudo wires being set as a communication path communicably coupling a pair of end nodes within the tunnel; and
a processor to:
select, from among packets being transmitted through a plurality of pseudo wires being set within the tunnel, one or more packets that are to be outputted from the tunnel to outside the tunnel at the apparatus, based on a packet arrival identifier included in each of the one or more packets, the packet arrival identifier taking on a predetermined value when the each of the one or more packets is to be outputted from the tunnel to outside the tunnel at the apparatus, and
output the selected one or more packets from the tunnel to outside the tunnel.

7. The apparatus of claim 6, wherein the processor selects, from the among the one or more packets, a first packet that is transmitted through a first pseudo wire included in the plurality of pseudo wires, based on a pseudo wire identifier included in each of the one or more packets, the pseudo wire identifier having a first value identifying the first pseudo wire when the first packet is transmitted through the first pseudo wire.

8. The apparatus of claim 6, wherein the processor is further configured to:
   set the packet arrival identifier having an initial value to a second packet, the initial value identifying a node at which the second packet is to be outputted from the tunnel to outside the tunnel, and
   transmit the second packet through a second pseudo wire included in the plurality of pseudo wires.

9. The apparatus of claim 8, wherein the processor sets, as the initial value of the packet arrival identifier, a number of nodes through which the second packet passes during transmission from the apparatus to the end node.

10. A method for transmitting a packet through a tunnel communicably coupling a plurality of nodes in a packet switched network, the method comprising:
   setting a plurality of pseudo wires each defined as a communication path communicably coupling a pair of first and second end nodes within the tunnel;
   inputting, by the first end node of a first pseudo wire included in the plurality of pseudo wires, a first packet from outside the tunnel into the tunnel;
   setting, by the first end node of the first pseudo wire, a packet arrival identifier having an initial value to the first packet, the initial value identifying the second end node at which the first packet is to be outputted from the tunnel to outside the tunnel;
   transmitting, by the first end node of the first pseudo wire, the first packet through the first pseudo wire;
   selecting, by the second end node of the first pseudo wire, from among packets being transmitted through the plurality of pseudo wires within the tunnel, one or more packets that are to be outputted from the tunnel to outside the tunnel, based on the packet arrival identifier included in each of the one or more packets; and
   outputting, by the second end node of the first pseudo wire, the one or more packets from the tunnel to outside the tunnel.

11. The method of claim 10, further comprising:
   setting, by the first end node of the first pseudo wire, to the first packet a pseudo wire identifier having a first value identifying the first pseudo wire; and
   selecting, by the second end node of the first pseudo wire, from among the one or more packets, the first packet transmitted through the first pseudo wire, based on the pseudo wire identifier included in each of the one or more packets: and
   outputting, by the second end node of the first pseudo wire, the selected first packet from the tunnel to outside the tunnel.

12. The method of claim 10, wherein the first end node of the first pseudo wire sets, as the initial value of the packet arrival identifier, a number of nodes through which the first packet passes during transmission from the first end node to the second end node of the first pseudo wire.

* * * * *